(12) United States Patent
Urbancic et al.

(10) Patent No.: US 10,329,888 B2
(45) Date of Patent: Jun. 25, 2019

(54) METHODS AND SYSTEMS FOR MONITORING AND MODELING HYDRAULIC FRACTURING OF A RESERVOIR FIELD

(75) Inventors: Theodore Ivan Urbancic, Inverary (CA); Adam Mirza Baig, Kingston (CA); Alice Guest, Calgary (CA); Kaitlyn Christine Mascher-Mace, Kingston (CA); Vladimir Sumila, Kingston (CA)

(73) Assignee: ENGINEERING SEISMOLOGY GROUP CANADA INC., Kingston, Ontario (CA)

( * ) Notice: Subject to any disclaimer, the term of this patent is extended or adjusted under 35 U.S.C. 154(b) by 379 days.

(21) Appl. No.: 13/507,231

(22) Filed: Jun. 14, 2012

(65) Prior Publication Data
US 2012/0318500 A1 Dec. 20, 2012

Related U.S. Application Data
(60) Provisional application No. 61/520,789, filed on Jun. 15, 2011.

(51) Int. Cl.
*G01V 1/28* (2006.01)
*E21B 43/26* (2006.01)

(52) U.S. Cl.
CPC ............. *E21B 43/26* (2013.01); *G01V 1/288* (2013.01); *G01V 2210/1234* (2013.01); *G01V 2210/65* (2013.01)

(58) Field of Classification Search
CPC ..................... G01V 1/288; G01V 2210/1234
See application file for complete search history.

(56) References Cited

U.S. PATENT DOCUMENTS 5,377,104 A 12/1994 Sorrells et al.
5,771,170 A * 6/1998 Withers et al. ............... 702/16
(Continued)

FOREIGN PATENT DOCUMENTS

CA 2044877 12/1991
WO WO 2010/136764 A2 12/2010

OTHER PUBLICATIONS

Williams-Stroud, S., et al., 2010, Beyond the dots in the box: Microseismicityconstrained fracture models for reservoir simulation: Presented at EAGE Barcelona, Spain.*
(Continued)

*Primary Examiner* — Saif A Alhija
*Assistant Examiner* — Bijan Mapar
(74) *Attorney, Agent, or Firm* — RatnerPrestia

(57) ABSTRACT

The method and system describes monitoring and modeling the hydraulic fracturing of a reservoir. The microseismic events caused by hydraulic fracturing on a reservoir are captured by sensor arrays. The data captured by the sensor arrays are then analyzed to determine the source radius, and seismic moment tensor of microseismic events caused by the hydraulic fracturing. This information is then combined with a seismic velocity model to arrive at a discrete fracture network showing at least the orientation, source radius, and source mechanism of each microseismic event. This discrete fracture network is then used to determine the stimulated surface area, stimulated volume, and point of diminishing returns for the hydraulic fracturing process. Hydraulic fracturing engineers can use the algorithms to monitor the well and/or determine well completion.

19 Claims, 34 Drawing Sheets
(32 of 34 Drawing Sheet(s) Filed in Color)

(56) References Cited

U.S. PATENT DOCUMENTS

| | | | |
|---|---|---|---|
| 5,963,508 A * | 10/1999 | Withers | 367/38 |
| 6,947,843 B2 * | 9/2005 | Fisher et al. | 702/13 |
| 7,453,766 B1 * | 11/2008 | Padgett | 367/73 |
| 7,460,436 B2 * | 12/2008 | Segall et al. | 367/35 |
| 7,647,183 B2 | 1/2010 | Jechumtalova et al. | |
| 7,660,194 B2 | 2/2010 | Uhl et al. | |
| 2005/0060099 A1 * | 3/2005 | Sorrells et al. | 702/14 |
| 2006/0062084 A1 * | 3/2006 | Drew | G01V 1/008 367/68 |
| 2008/0004847 A1 | 1/2008 | Bradford | |
| 2008/0151691 A1 * | 6/2008 | Eisner et al. | 367/38 |
| 2009/0299637 A1 | 12/2009 | Dasgupta | |
| 2010/0157730 A1 * | 6/2010 | Bradford | 367/38 |
| 2010/0256964 A1 * | 10/2010 | Lee et al. | 703/10 |
| 2010/0307755 A1 * | 12/2010 | Xu et al. | 166/308.1 |
| 2011/0029293 A1 * | 2/2011 | Petty et al. | 703/2 |
| 2011/0067857 A1 * | 3/2011 | Underhill et al. | 166/250.01 |
| 2011/0120718 A1 * | 5/2011 | Craig | E21B 43/26 166/308.1 |
| 2011/0188347 A1 * | 8/2011 | Thiercelin | G01V 1/00 367/38 |
| 2011/0257944 A1 * | 10/2011 | Du | E21B 43/267 703/2 |
| 2012/0239363 A1 * | 9/2012 | Durrani et al. | 703/10 |
| 2013/0246023 A1 | 9/2013 | Chapman et al. | |
| 2013/0304437 A1 * | 11/2013 | Ma | G06F 17/5009 703/2 |

OTHER PUBLICATIONS

Starzec, P., and C-F. Tsang. "Use of fracture-intersection density for predicting the volume of unstable blocks in underground openings." International Journal of Rock Mechanics and Mining Sciences 39.6 (2002): 807-813.*

Rowe, C. A., et al. "Using automated, high-precision repicking to improve delineation of microseismic structures at the Soultz geothermal reservoir." The Mechanism of Induced Seismicity. Birkhäuser Basel, 2002. 563-596. (Year: 2002).*

Canadian Office Action issued for CA Application No. 2,779,996 dated Mar. 11, 2014.

Withers et al., "A Comparison of Select Trigger Algorithms for Automated Global Seismic Phase and Event Detection," Bulletin of the Seismological Society of America, vol. 88, No. 1, pp. 95-106, Feb. 1998.

Prugger et al., "Microearthquake Location: A Nonlinear Approach That Makes Use of a Simplex Stepping Procedure," Bulletin of the Seismological Society of America, vol. 78, No. 2, pp. 799-815, Apr. 1988.

Urbancic et al., "Automatic Time-Domain Calculation of Source Parameters for the Analysis of Induced Seismicity," Bulletin of the Seismological Society of America, vol. 86, No. 5, pp. 1627-1633, Oct. 1996.

Brune, "Tectonic Stress and the Spectra of Seismic Shear Waves from Earthquakes," Journal of Geophysical Research, vol. 75, No. 26, pp. 4997-5009, Sep. 10, 1970.

Walter et al., "Spectra of Seismic Radiation From a Tensile Crack," Journal of Geophysical Research, vol. 98, No. B3, pp. 4449-4459, Mar. 10, 1993.

Trifu et al., "Short Notes: A Fast Evaluation of the Seismic Moment Tensor for Induced Seismicity," Bulletin of the Seismological Society of America, vol. 90, No. 6, pp. 1521-1527, Dec. 2000.

Hudson et al., "Source Type Plot for Inversion of the Moment Tensor," Journal of Geophysical Research, vol. 94, No. B1, pp. 765-774, Jan. 10, 1989.

Dufumier et al., "On the resolution of the isotropic component in moment tensor inversion," Geophys. J. Int., (1997), 595-606.

Gephart et al., "An Improved Method for Determining the Regional Stress Tensor Using Earthquake Focal Mechanism Data: Application to the San Fernando Earthquake Sequence," Journal of Geophysical Research, vol. 89, No. B11, pp. 9305-9320, Oct. 10, 1984.

Müller, "Volume Change of Seismic Sources from Moment Tensors," Bulletin of the Seismological Society of America, 91, 4, pp. 880-884, Aug. 2001.

Guest et al., "Relationship between the Hydraulic Fracture and Observed Microseismicity in the Bossier Sands, Texas," Canadian Unconventional Resources and International Petroleum Conference, Calgary, Alberta, Canada, Oct. 19-21, 2010.

Focal Mechanism—Wikipedia, the free encyclopedia, http://en.wikipedia.org/wiki/Moment_tensor_solution, Jun. 10, 2011.

Vavryčuk, "Inversion for parameters of tensile earthquakes," Journal of Geophysical Research, vol. 106, No. B8, pp. 16,339-16,355, Aug. 10, 2001.

Eisner et al., "Beyond the dots in the box: microseismicity-constrained fracture models for reservoir simulation," The Leading Edge, pp. 936-942, Mar. 2010.

Williams-Stroud et al., "Stimulated Fractured Reservoir DFN Models Calibrated With Microseismic Source Mechanisms," 44th U.S. Rock Mechanics Symposium and 5th U.S.-Canada Rock Mechanics Symposium, Jun. 27-30, 2010, Salt Lake City, Utah (Abstract).

Urbancic et al., "Using Microseismicity to Map Cotton Valley Hydraulic Fractures," SEG 2000 Expanded Abstracts.

Baig et al., "Microseismic moment tensors: A path to understanding frac growth," The Leading Edge, pp. 320-324, Mar. 2010.

Williams-Stroud, "Using Microseismic Events to Constrain Fracture Network Models and Implications for Generating Fracture Flow Properties for Reservoir Simulation," 2008 SPE Sale Gas Production Conference, Fort Worth, Texas, Nov. 16-18, 2008.

Eaton, "Microseismic focal mechanisms: A tutorial," CREWES Research Report vol. 20 (2008).

Baig et al., "Magnitude Determination, Event Detectability, and Assessing the Effectiveness of Microseismic Monitoring Programs in Petroleum Applications," CSEG Recorder, Feb. 2010, pp. 22-26.

Canadian Office Action issued in CA Patent Application No. 2,779,996 dated Aug. 11, 2014.

* cited by examiner

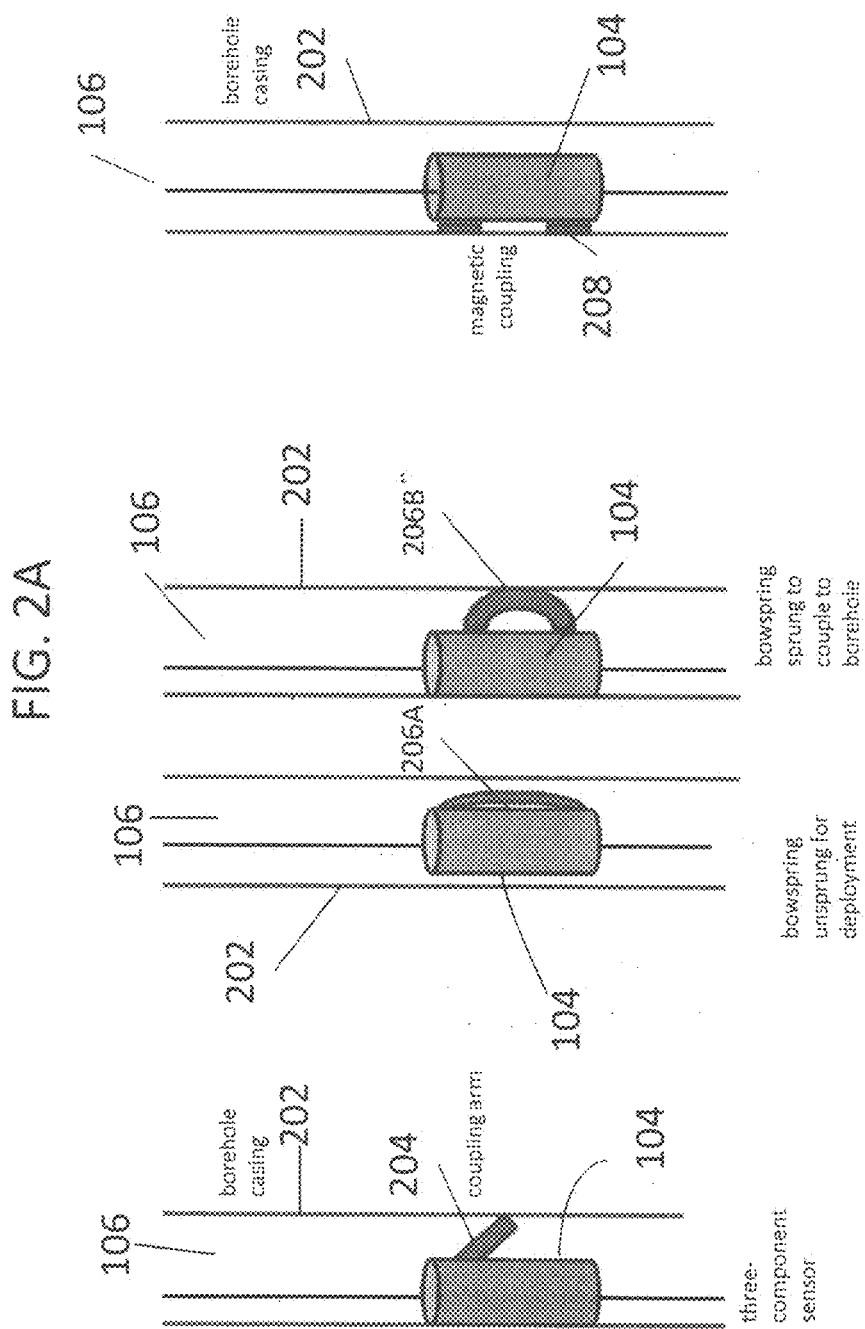

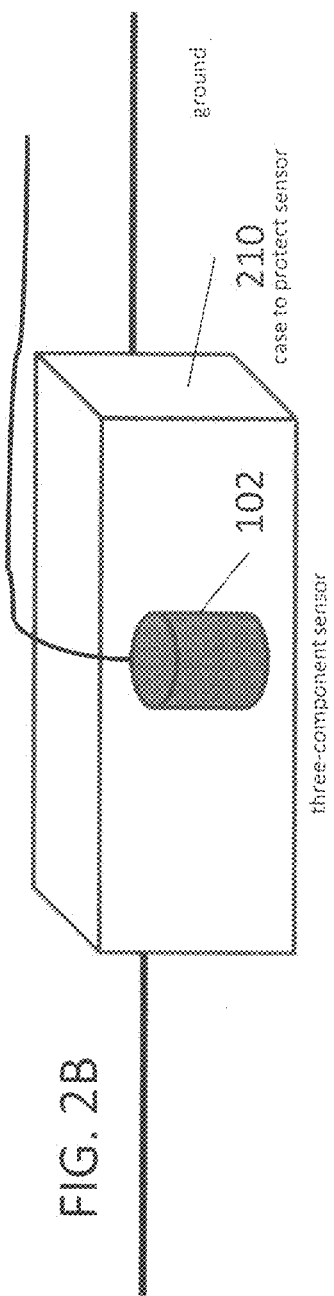

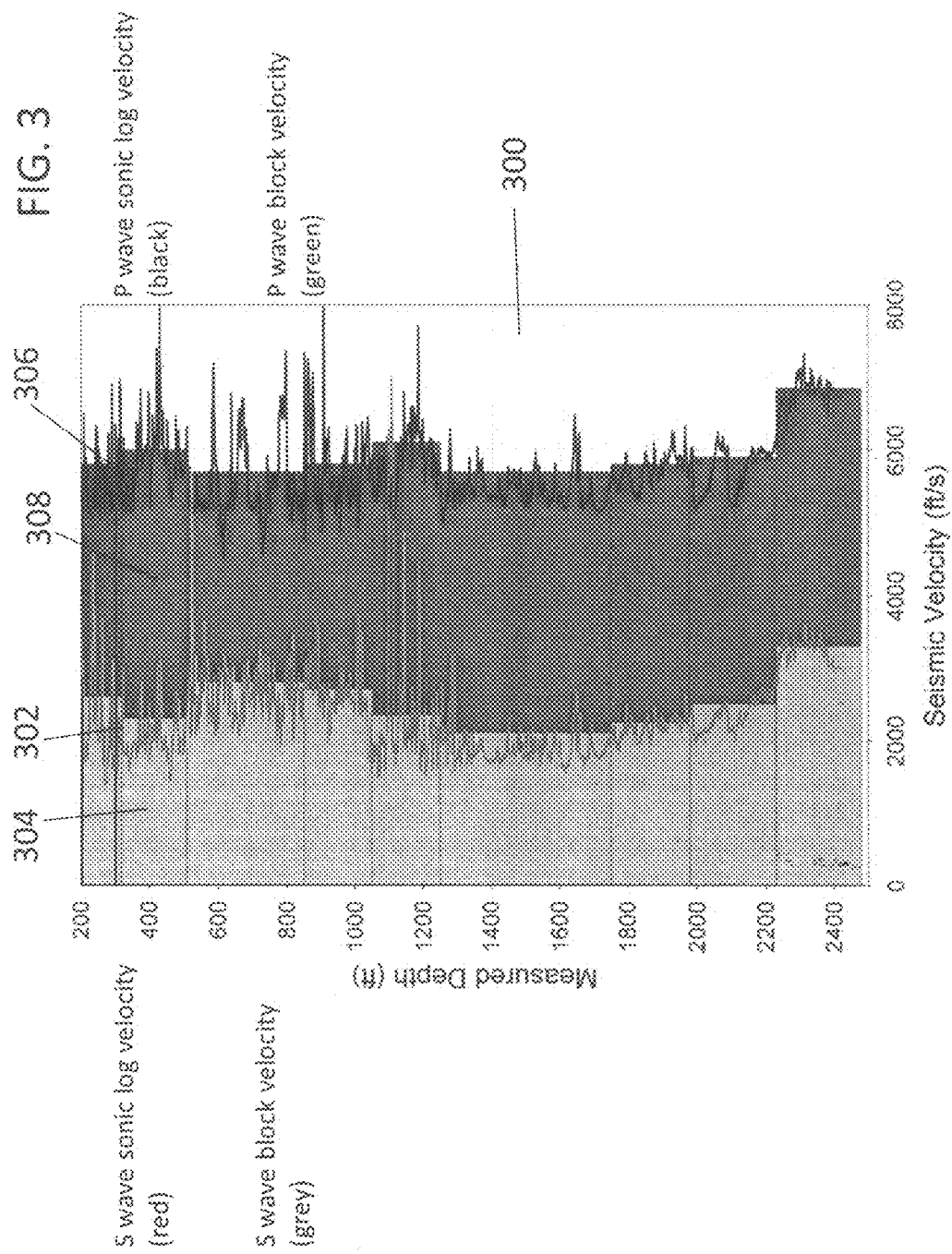

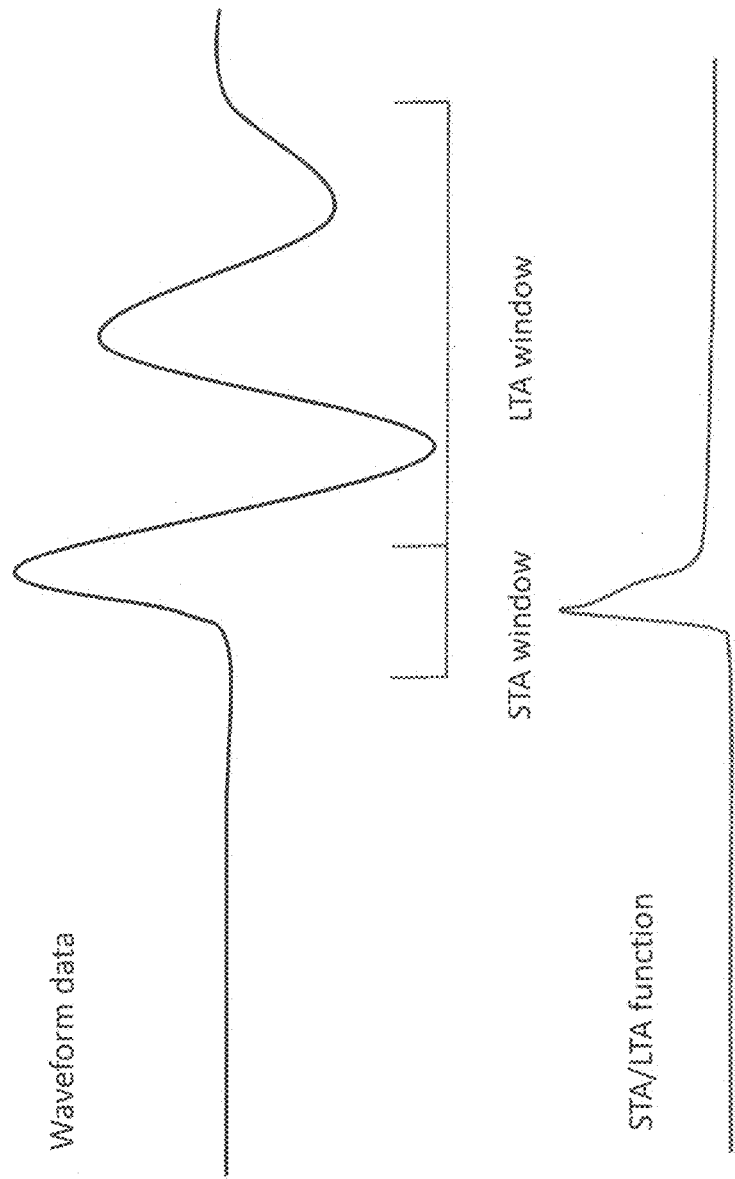

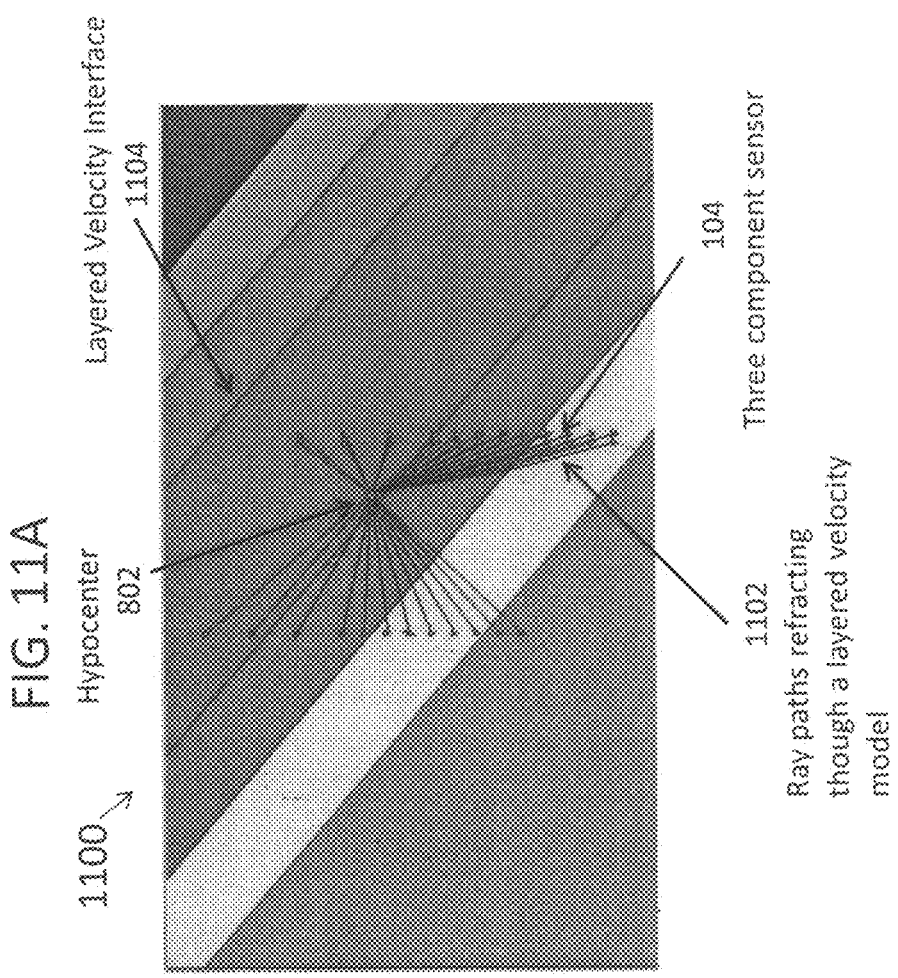

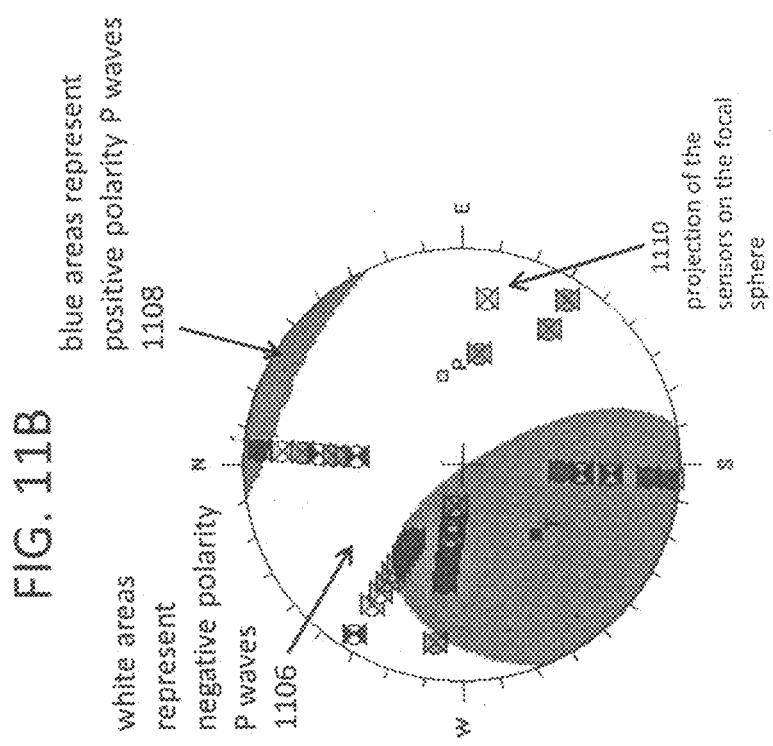

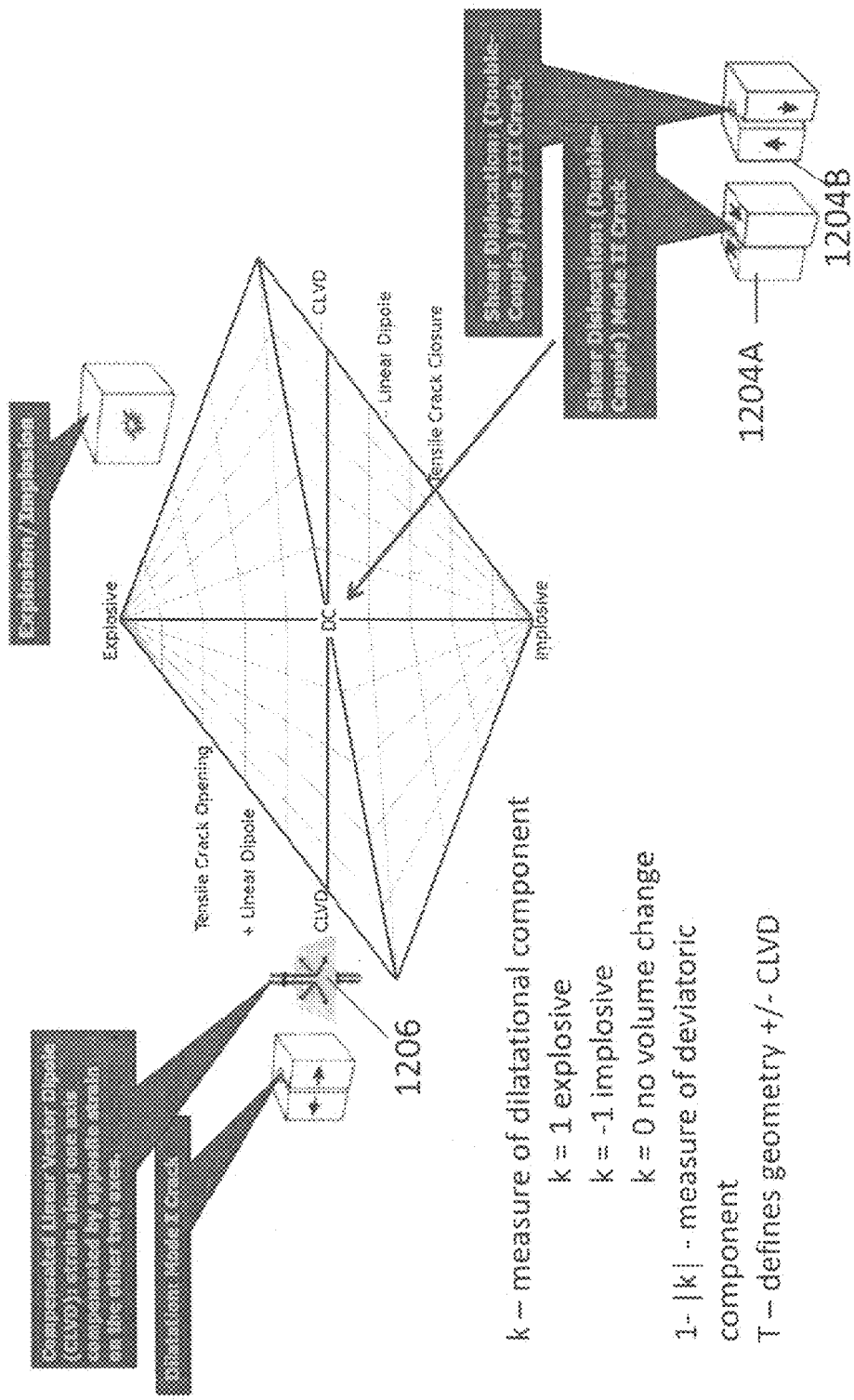

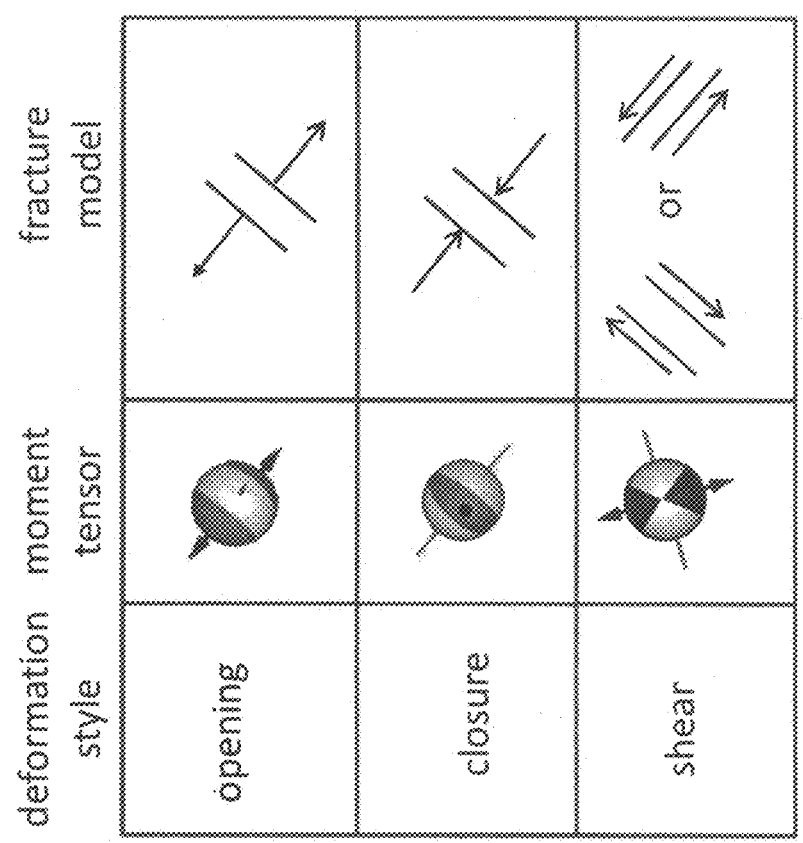

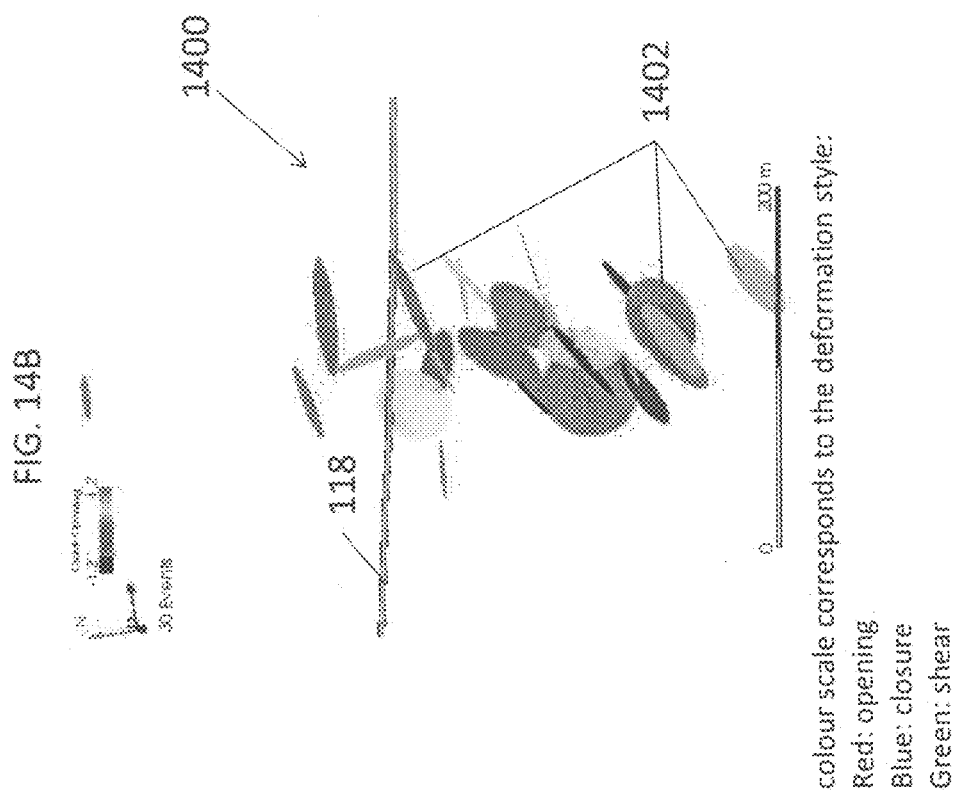

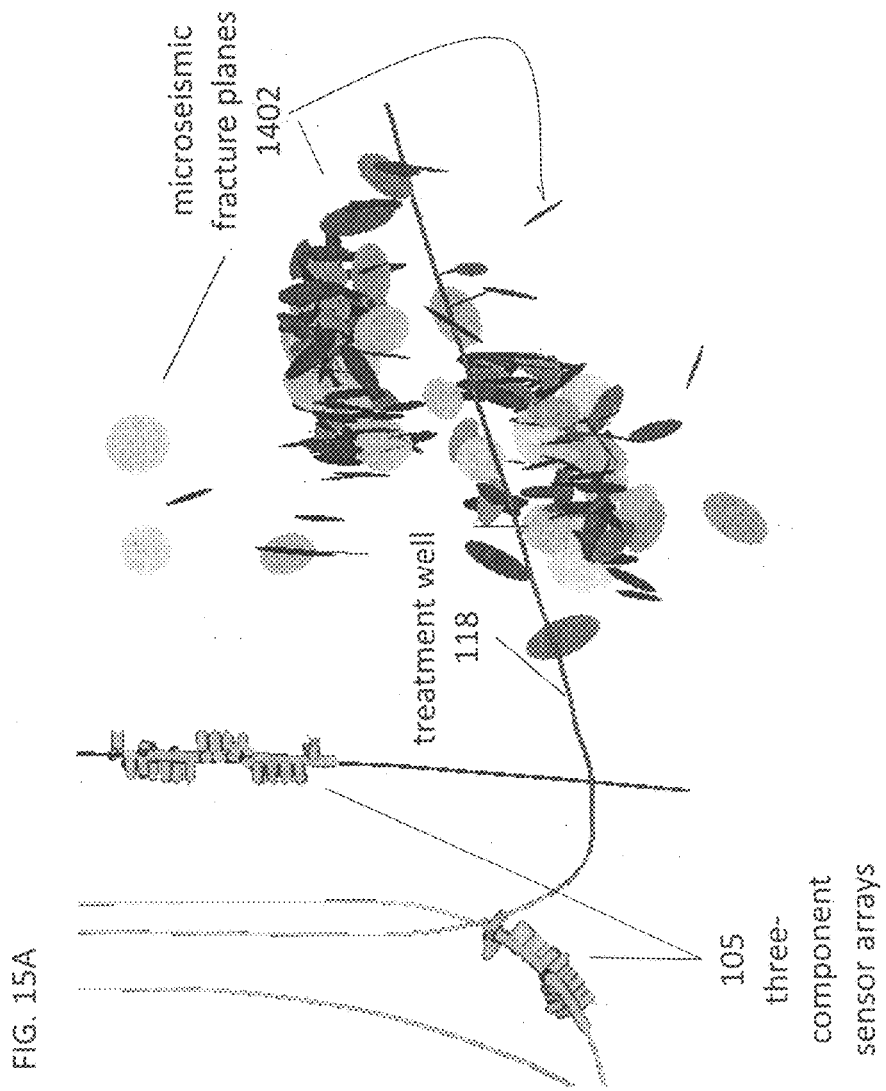

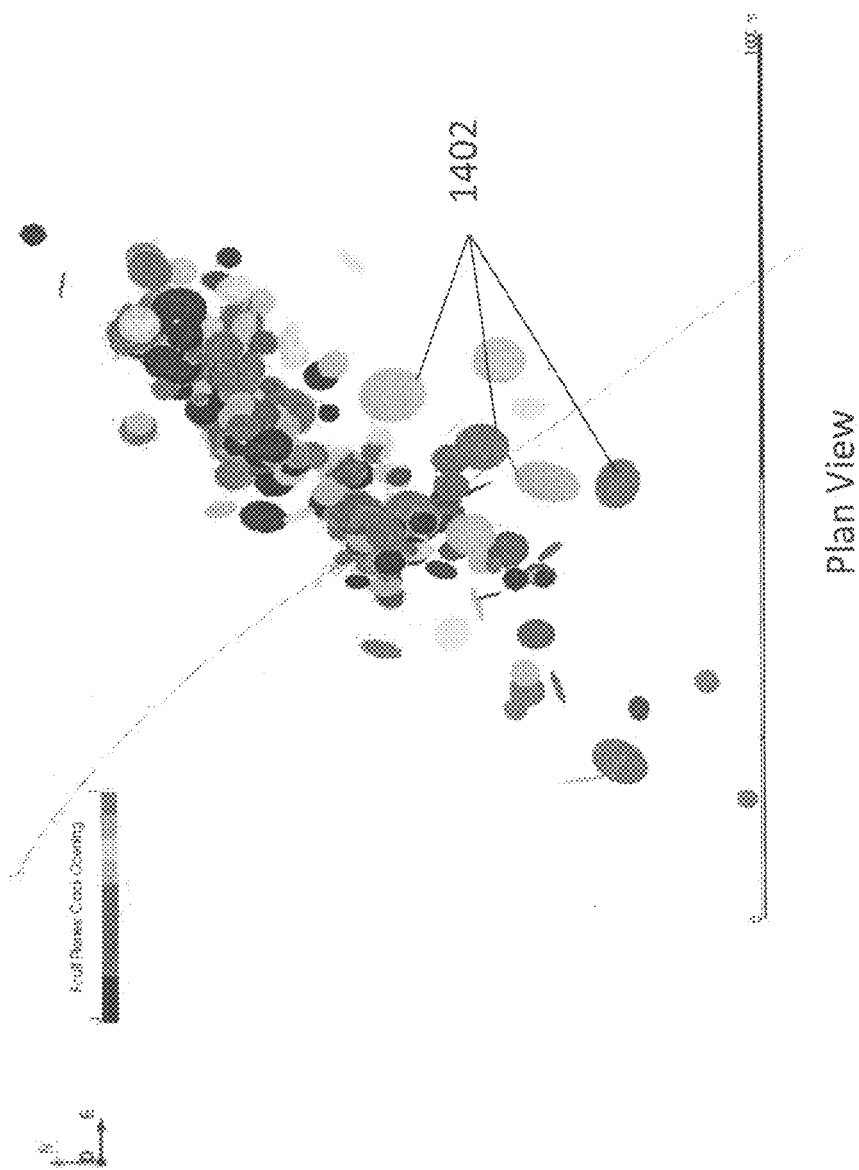

METHODS AND SYSTEMS FOR MONITORING AND MODELING HYDRAULIC FRACTURING OF A RESERVOIR FIELD

CROSS-REFERENCE TO RELATED APPLICATION

This application claims the benefit of and priority to U.S. Patent Application Ser. No. 61/520,789, filed Jun. 15, 2011, the contents of which are incorporated herein by reference.

FIELD OF THE INVENTION

The invention relates to methods and systems for monitoring and modeling hydraulic fracturing of a reservoir.

BACKGROUND

Hydraulic fracturing is used to fracture rock surrounding a treatment well and pump the created fractures with a mixture of fluid and granular media (proppant) to enhance the permeability of the rock formation the treatment well. If the formation contains a hydrocarbon reservoir, treatments such as hydraulic fracturing seek to increase the production of the reservoir by creating pathways through which the hydrocarbons can flow to the treatment well. A typical scenario is in gas-bearing shale formations where the inherent permeability of the rock is too low to allow for efficient drainage of the reservoir. Hydraulic fracturing allows for the gas trapped in pore spaces of the shale to be produced, even from long distances from a production well, due to the enhanced permeability of the hydrocarbon-bearing formation that the injected proppant imparts.

Given the underground location in the reservoir and small size of the formations it is difficult to predict how the reservoir will behave in response to hydraulic fracturing.

In the process of creating and reactivating cracks in the formation, hydraulic fracturing generates small-scale seismic events. This, seismic energy generated by these events propagates away from the location of the fracture, which is known as the hypocenter. These seismic events, called microseismic events, typically measure less than 0 on the moment magnitude scale. In contrast, earthquakes that are felt by humans and reported on surface need to reach magnitudes of 3 or more.

Microseismic events caused by the hydraulic fracturing can be used to monitor and model the effect of hydraulic fracturing on the reservoir. Improved methods, devices, and systems for monitoring and modeling hydraulic fracturing are desirable.

SUMMARY

In one aspect an embodiment provides a method for monitoring and modeling the hydraulic fracturing of a reservoir. Source radius data are generated for a plurality of microseismic events resulting from hydraulic fracturing of a reservoir, where the source radius data are generated from microseismic data collected during hydraulic fracturing and where the source radius data comprise location information and a radius for each microseismic event. The seismic moment tensor is determined for each of the microseismic events using a seismic velocity model and the collected microseismic data, where the seismic moment tensor data comprise orientation and source mechanism type of the microseismic event. The discrete fracture network (DFN) model of fractures which occurred during the hydraulic fracturing of the reservoir is generated, where the discrete fracture network model is generated from the seismic moment tensor and source radius data of each of the plurality of microseismic events. The DFN model also comprises the location, radius, orientation, and source mechanism type of each of the plurality of microseismic events, where the mechanism types include mechanisms associated with microseismic data representing opening and closing microseismic events.

The microseismic data may include data regarding the Primary (P) and Secondary (S) wave and is collected from at least two down-well sensor arrays (possibly deployed in the same well); or a number of downhole arrays with a network of sensors on the surface or near-surface; or an entire network of surface and near-surface deployed sensors. Furthermore, generating the discrete fracture network model comprises generating source mechanism types including mechanisms associated with microseismic data representing opening, closing, and shearing microseismic events.

Prior to generating source radius data and determining a seismic moment tensor, microseismic data may be collected during hydraulic fracturing of the reservoir using a plurality of seismic sensors.

The seismic velocity model may be obtained from a well log, a vertical seismic profile, or by seismic profiling through reflection/refraction surveys.

A graphical representation of the DFN model may be output through an output device.

A stimulated reservoir volume model of the reservoir affected by the hydraulic fracturing may be generated by using the DFN model, SMTI, and source radius information, where geometrically overlapping DFN seismic events are considered to be connected to a stimulation well from which the reservoir was stimulated by hydraulic fracturing.

A graphical representation of the stimulated reservoir volume model may be output through an output device.

A stimulated surface area model affected by the hydraulic fracturing may be generated from the DFN model and SMT.

A graphical representation of stimulated surface area model may be output through an output device.

A point of diminishing returns may be determined using the SMT and fracture engineering data obtained from the hydraulic fracturing procedure by correlating the fracture engineering data with the SMT data in different time windows to determine when additional hydraulic fracturing treatment is not making significant changes in extending the fracture as represented by increasing opening seismic events.

In another aspect, an embodiment provides a system for determining the effect of hydraulic fracturing on a reservoir, the system comprising a plurality of seismic sensors for collecting microseismic data. The system comprises a computer and associated computer readable program code stored on a non-transitory computer readable medium, where such code when executed on the computer causes the computer to generate source radius data for a plurality of microseismic events resulting from hydraulic fracturing of a reservoir. The source radius data is also generated from microseismic data collected during hydraulic fracturing, wherein the source radius data comprises location information and a radius for each microseismic event. The code when executed on the computer also causes the computer to determine a seismic moment tensor for each of the microseismic events using a seismic velocity model and the collected microseismic data, where the seismic moment tensor data comprises orientation and source mechanism type of the microseismic event. The computer will generate a discrete fracture network model of fractures which occurred during the hydraulic fracturing of the reservoir, where the discrete fracture network model is generated from the seismic moment tensor and source radius data of each of the plurality of microseismic events, where the discrete fracture network comprises the location, radius, orientation, and source mechanism type of each of the plurality of microseismic events, and where generating the discrete fracture network model comprises generating source mechanism types including mechanisms associated with microseismic data representing opening and closing microseismic events.

In another aspect, an embodiment provides a computer program product comprising a non-transitory computer usable medium, a computer readable program code stored on the medium. The code, when executed on a computer processor, causes the processor to generate source radius data for a plurality of microseismic events resulting from hydraulic fracturing of a reservoir, wherein the source radius data is generated from microseismic data collected during hydraulic fracturing, wherein the source radius data comprises location information and a radius for each microseismic event; determine a seismic moment tensor for each of the microseismic events using a seismic velocity model and the collected microseismic data, wherein the seismic moment tensor data comprises orientation and source mechanism type of the microseismic event; generate a discrete fracture network model of fractures which occurred during the hydraulic fracturing of the reservoir, wherein the discrete fracture network model is generated from the seismic moment tensor and source radius data of each of the plurality of microseismic events, wherein the discrete fracture network comprises the location, radius, orientation, and source mechanism type of each of the plurality of microseismic events, and wherein generating the discrete fracture network model comprises generating source mechanism types including mechanisms associated with microseismic data representing opening and closing microseismic events.

In another aspect is a method comprising: generating source radius data for a plurality of microseismic events resulting from hydraulic fracturing of a reservoir, wherein the source radius data is generated from microseismic data collected during hydraulic fracturing, wherein the source radius data comprises location information and a radius for each microseismic event; determining a seismic moment tensor for at least some of the microseismic events, the seismic moment tensor comprises orientation and source mechanism type of the microseismic event; and generating a discrete fracture network model of fractures which were activated during the hydraulic fracturing of the reservoir, wherein the discrete fracture network model is generated from the seismic moment tensor and source radius data of at least some of the plurality of microseismic events, wherein the discrete fracture network comprises the location, radius, orientation, and source mechanism type of each of the at least some of the plurality of microseismic events.

Other aspects and embodiments, such as for example systems operating in accordance with above methods, and computers and stored algorithm embodying instructions to operate in accordance with the above methods, will be evident from the brief description, detail description and accompanying FIGS.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

Reference will now be made, by way of example, to the accompanying drawings which show example embodiments of the present description, and in which:

FIG. 2A is a schematic cross-sectional view showing alternate seismic sensor couplings to affix the sensors to a borehole of an observation well in the hydraulic monitoring system of FIG. 1.

FIG. 2B is a schematic cross-sectional view showing how a seismic sensor may be positioned on the ground surface above a reservoir in the hydraulic monitoring system of FIG. 1.

FIG. 3 is a graph showing an example seismic velocity model showing seismic velocity as a function of depth for a reservoir similar to the reservoir of FIG. 1.

FIG. 5 is an illustration representing an example seismic waveform and an example STA/LTA function derived from the waveform, which example function represents a microseismic event.

FIG. 9 is graphical illustration of corner frequency determination employing a Brune model fit for the P wave of a microseismic event of.

FIG. 11A is a graphical illustration of reflecting and refracting microseismic energy radiating from a hypocenter.

FIG. 11B is a contour plot of the P wave showing positive and negative polarity P waves of FIG. 11A mapped on a focal sphere, with the projection of the applicable sensors on the focal sphere.

FIG. 12 is a source type plot which can be utilized to graphically illustrate modes of deformation for a set of example seismic events, and the source types associated with locations on the plot.

FIG. 14A is table representation of microseismic deformation styles, and corresponding moment tensors and fracture models.

FIG. 14B is a graphical representation of an example partial discrete fracture network model derived from seismic data captured, for example, by the system of FIG. 1 and derived, for example, utilizing the methods and algorithms described with reference to the other FIGS; the events graphically represented as circles providing event location, source type, source radius, and orientation.

FIGS. 15A to 15C are graphical representations of examples of discrete fracture network model similar to that of FIG. 14B in relation to a stimulation well and sensors in the form of sensor arrays.

DETAILED DESCRIPTION

As shown in FIGS. 1 to 28, the present disclosure describes methods and systems for determining the effects of hydraulic fracturing on a well using microseismic event data collected through a plurality of sensors.

Deployment of sensors in favourable geometries capable of recording the displacement induced by the event as it propagates away from the hypocenter can be used to accurately locate this source and therefore map where the rock is responding to the injection.

In addition to determining the hypocenter, the pattern of radiation away from the hypocenter can be used to determine the mechanism of the seismic event. This radiation pattern can be determined by examining the characteristics of the waveform generated by the seismic event. In order to capture sufficient data to determine the source mechanism, the geometry of the sensors must cover a range of angles around the event (i.e., azimuthal coverage). Sufficient data can be captured if the sensors are deployed in linear arrays in wells around the treatment zone. These arrays can take advantage of wells that are neither producing nor being treated. Similar coverage can be achieved through a surface or near surface deployment of a series of sensors.

Moment tensor data can also be used to determine the mode of failure related to the seismic event. These modes of failure describe the type of seismic activity occurring at the source, indicating whether the fracture was opening or closing, or whether the two sides of the fracture were sliding against each other (i.e., a shearing force).

Collecting and analyzing multiple types of failures can provide a more complete understanding of the effect of hydraulic fracturing on the stimulation well. As will be discussed later herein, information can be derived regarding the effects of hydraulic fracturing on well permeability, the volume of the well that is being stimulated by fracturing, and whether fracturing has reached a level of dimininshing returns.

Figure 1:
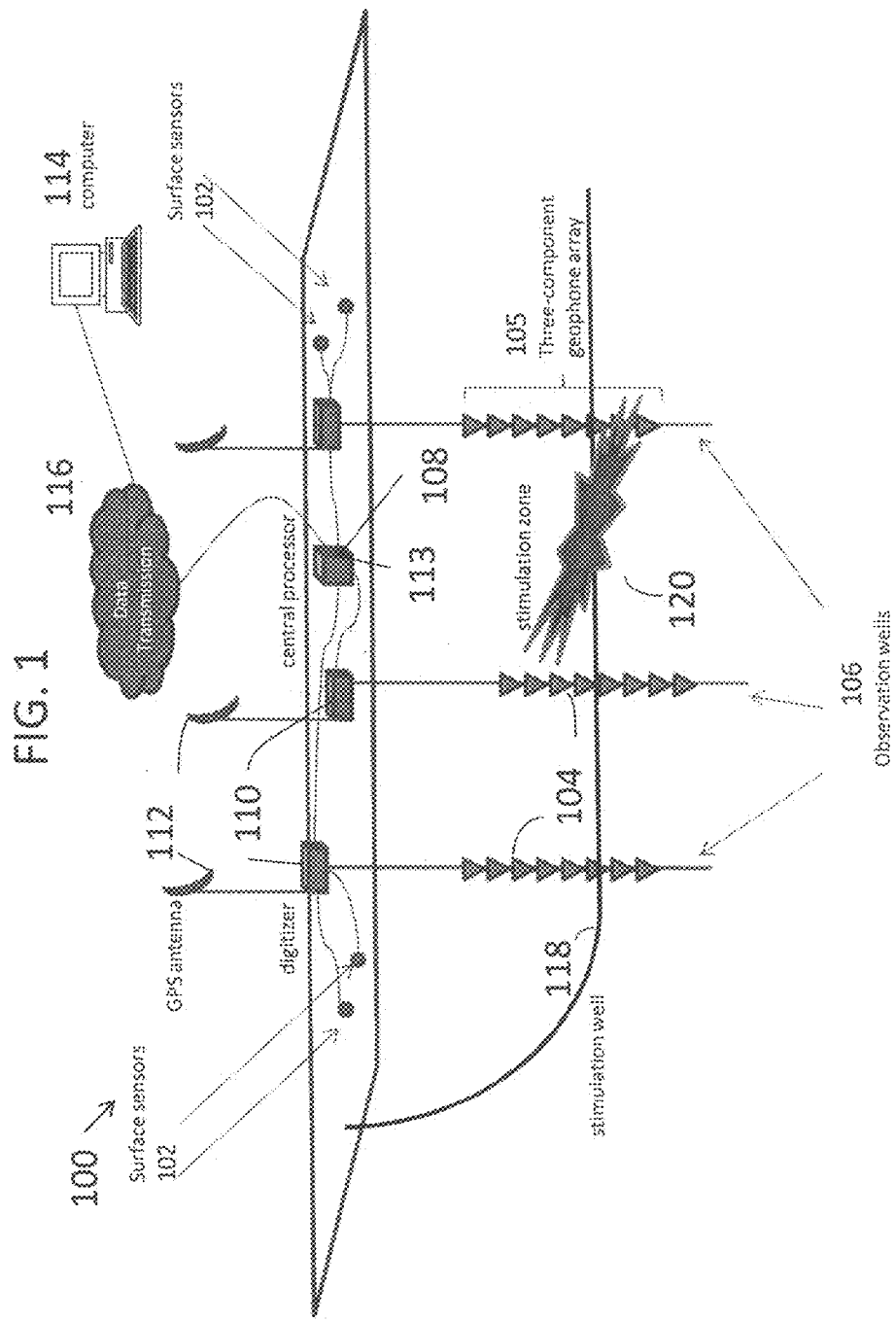
FIG. 1 is a schematic illustration of an example hydraulic fracturing monitoring system deployed to collect microseismic data caused by hydraulic fracturing from a stimulation well of a reservoir.

FIG. 1 is a schematic illustration of a hydraulic fracturing monitoring system 100, according to an example embodiment, deployed to collect microseismic data caused by hydraulic fracturing from a stimulation well of a reservoir. Referring to FIG. 1, a plurality of seismic sensors 102, 104 measuring ground displacement or one of its derivatives (e.g., velocity or acceleration) are deployed in the vicinity of the expected microseismic activity. The plurality of sensors 102, 104 are deployed throughout the vicinity of the expected microseismic activity, which can include deploying sensors 102 on ground level and/or deploying sensors 104 below ground level down one or more observation wells 106. Out of use stimulation wells can be used as observation wells if available. The seismic sensors 102, 104 can include, but are not limited to, geophones, accelerometers, or any other device that measures ground motion. For example, sensors 104 that are deployed in observation wells 106 may include three-component geophone arrays. The sensors 102, 104 are configured to record data corresponding to the three components of ground motion corresponding to the elastic waves generated by the microseismic activity (notably the Primary (P) and Secondary (S) waves).

The sensors 102, 104 are connected electrically to a computing device 108 such as a central processing unit (CPU), for example a Dell R300, operating in accordance with computer program instructions stored in memory, such that the electronic signals generated by the sensors can be captured on a local storage device (for example, persistent storage 113 associated with computing device 108), or transmitted for remote storage. The data collected by the plurality of sensors 102,104 can be digitized, for example with a digitizer 110 sold under the trademark Paladin by ESG Solutions Inc., of Kingston, Ontario, Canada, and time-stamped using a GPS synchronized time source 112 so that the data collected are precisely time-synchronized across all sensors 102, 104. The data collected by the digitizers 110 from the plurality of sensors 102, 104 can then be transmitted to a local data storage device 113 where the data from the plurality of sensors 102, 104 are combined in computer 108 to arrive at a time-synchronized record of the microseismic activity captured by the plurality of sensors 102, 104.

As will be explained in greater detail below, a stimulation well 118 allows a micro seismic event to be generated at a stimulation zone 120.

Referring to FIG. 2A, to ensure that the below ground seismic sensors 104 are faithfully recording the microseismic activity the sensors 104 can be mechanically or magnetically affixed to the casing 202 of the borehole of the observation well 106. For example, FIG. 2A shows three possible ways of affixing the sensors 104 to the borehole casing 202, including the use of a coupling arm 204, a bowspring (bowspring 206a unsprung for deployment; bowspring 206b sprung to couple to borehole), or magnets 208. It would be clear to a skilled technician, however, that other means of affixing the sensor to the borehole casing 202 would be equally effective. As shown in FIG. 2B, above ground sensors 102, which can be three-component sensors for example, can be enclosed in a protective case 210.

The following algorithms and data, such as models, can be stored and processed locally on the memory, CPU and storage device of on-site computing device 108 previously mentioned, or alternatively, the collected seismic data can be transmitted or otherwise transported to a remote location, for example across a computer network 116 such as the Internet, for processing on a remote computer 114 having associated memory and storage device for the algorithms and data. The algorithms may be stored in memory in the form of computer programs which computer programs when operated on the computer cause the computer 108, 114 to carry out the algorithms using stored or received data, and storing the results of such algorithms following processing. A computer 108, 114 may have an associated monitor to allow an operator to view the data or graphical representations thereof and human interface devices such as a pointing device (for example, a mouse) and a keyboard for operator control, such as requests for particular graphical representations generated by the algorithms, and a display screen 118 for viewing of the data or graphical representations. It is recognized that the various functions of the computers 108, 114 mentioned in this description could be distributed across more than one computer 108, 114, and such distributed computers could interact locally or remotely, for example through a computer network such as the Internet.

It is further recognized that the algorithms described in this description can operate independent of the sensing system described in this description. The algorithms can be operated in a central location for a plurality of remote sensing systems. The algorithms can be used in realtime as data is collected provided that computers and communication networks of sufficient speed and capacity are available. Alternatively, sensed data can be stored for later use in conjunction with the algorithms.

Referring now to FIG. 3, a model of seismic velocities can be used to locate accurately microseismic events. This seismic velocity model 300 can be constructed from well log information where a sensor commonly referred to as a dipole sonic logger measures wave velocities in the vicinity of the borehole 106 in which it is located. A model of velocities can also be provided by other means, such as a vertical seismic profile or by seismic profiling through reflection/refraction surveys. This information can be used in determining the composition and structure of the reservoir in the vicinity of the borehole 106. As shown in FIG. 3, the seismic velocity model 300 will show the measured seismic velocity of both the P and S waves in relation to its depth (S wave sonic log velocity 302, S wave block velocity 304, P wave sonic log velocity 306 and P wave block velocity 308).

Figure 4B:
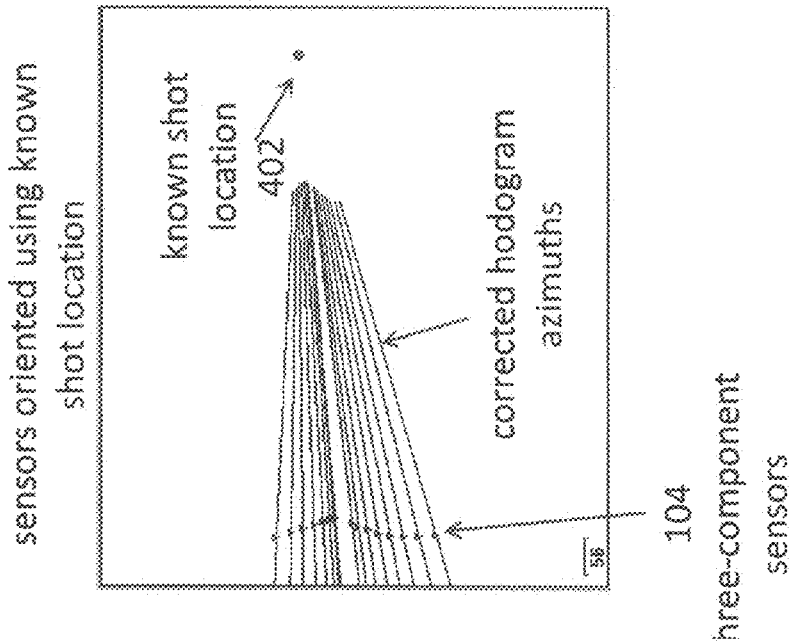
FIG. 4B is a schematic illustration of the deployed array of sensors of FIG. 4A and the corrected hodogram azimuths after sensor calibration using the known shot location.
Figure 4A:
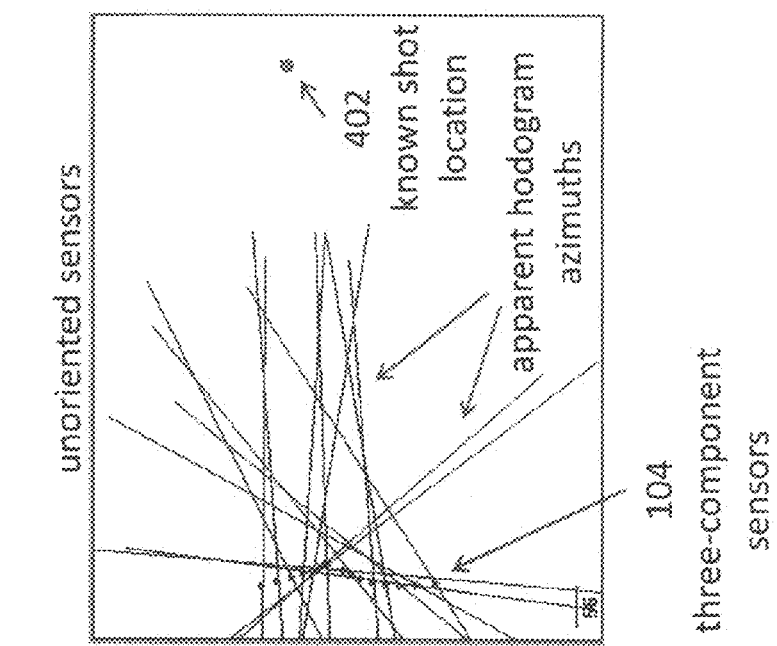
FIG. 4A is a schematic illustration of a deployed array of sensors for the system of FIG. 1 and apparent hodogram azimuths for a known shot location prior to sensor calibration.

Referring to FIGS. 4A and 4B, prior to recording microseismic activity the sensors 102, 104 are calibrated. FIG. 4A is a graphical representation of data collected by the sensors 104 in an uncalibrated system. FIG. 4B is a graphical representation of data collected by the sensors 104 in a calibrated system. Calibration is usually accomplished by recording the microseismic signals from an event with a known location 402, such as a perforation shot in a well, an explosive charge placed in a downhole well or on the surface, or a seismic vibrator (vibroseis) truck on the surface. Knowing that the primary (P) wave energy from these sources will be aligned with the direction to the source, the previously unknown orientation of a sensor can be determined. For example, A rotation matrix can then be determined for each of the sensors 104 to apply to subsequently measured signals and correct for any variations in the orientations of the respective sensors 104.

Referring now to FIG. 5, trigger logic can be used for automated identification of when microseismic events occur in signals collected by the sensor array. For example, an algorithm can determine a short term averaging/long term averaging (STA/LTA) function from a microseismic waveform (signal) by taking the root means square (RMS) average of the signal over a short window and a long window. The short term average is divided by the long term average for each channel to obtain the function. Potential events are identified when this function is strongly peaked over a number of channels. Other types of trigger logic can be used to identify potential events, usually consisting of scanning the data for relatively large amplitudes on a number of different channels. Manual intervention by operators through the human interface device of computer device 108, 114 in response to data displayed on a display can allow for manual confirmation to the algorithm of automated identification of when microseismic events occur, or manual identification to the algorithm of when microseismic events occur.

Figure 6:
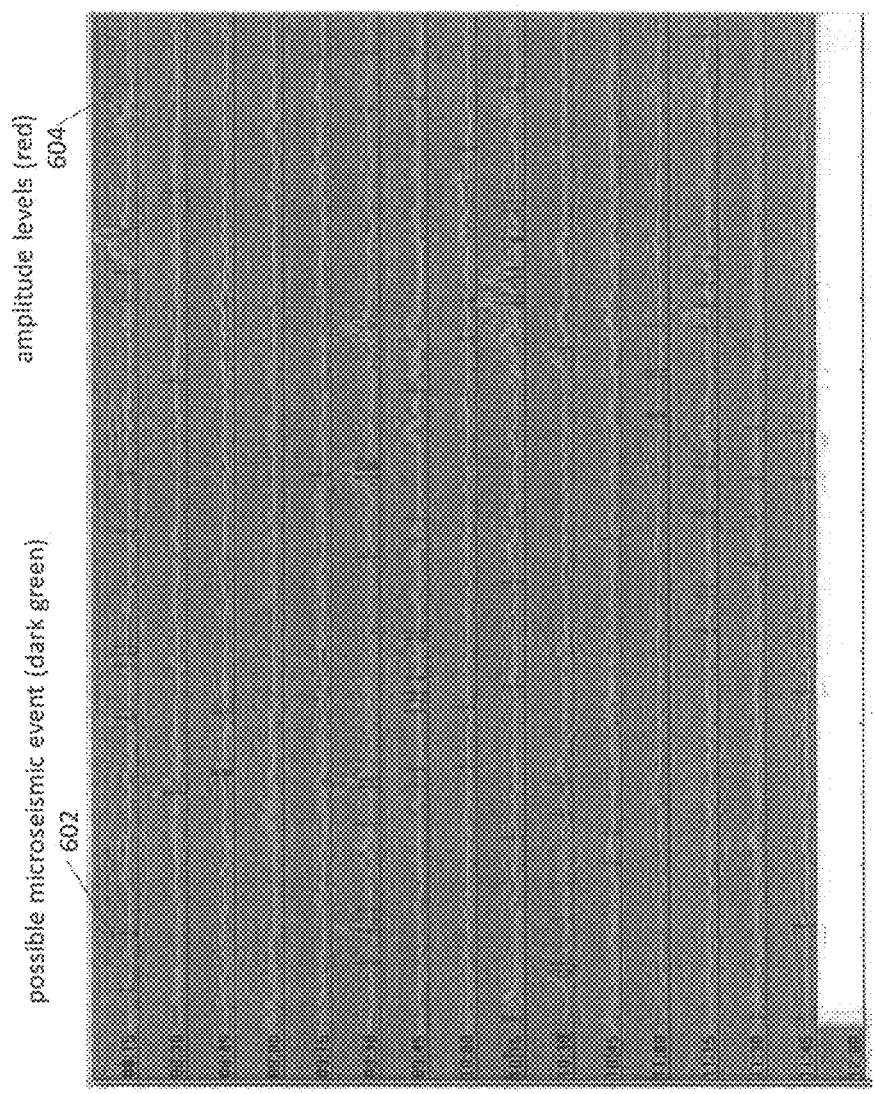
FIG. 6 is a time-based graph depicting microseismic data recorded by the sensors of FIG. 1 and potential microseismic events identified, for example, using the trigger logic of FIG. 5.

Referring now to FIG. 6, the time-stamped data collected by the plurality of sensors 102, 104 is analyzed to identify the time of potential microseismic events. Using the STA/LTA algorithm as described above (see also A Comparison of Select Trigger Algorithms for Automated Global Seismic Phase and Event Detection, Withers et al., Bulletin of the Seismological Society of America, Vol. 85, No. 1, pp 95-106, February 1998, the contents of which are incorporated by reference into this detailed description), potential microseismic events 602 are detected when this function is strongly peaked over a number of channels, wherein a channel is the data collected by a single sensor.

Figure 7:
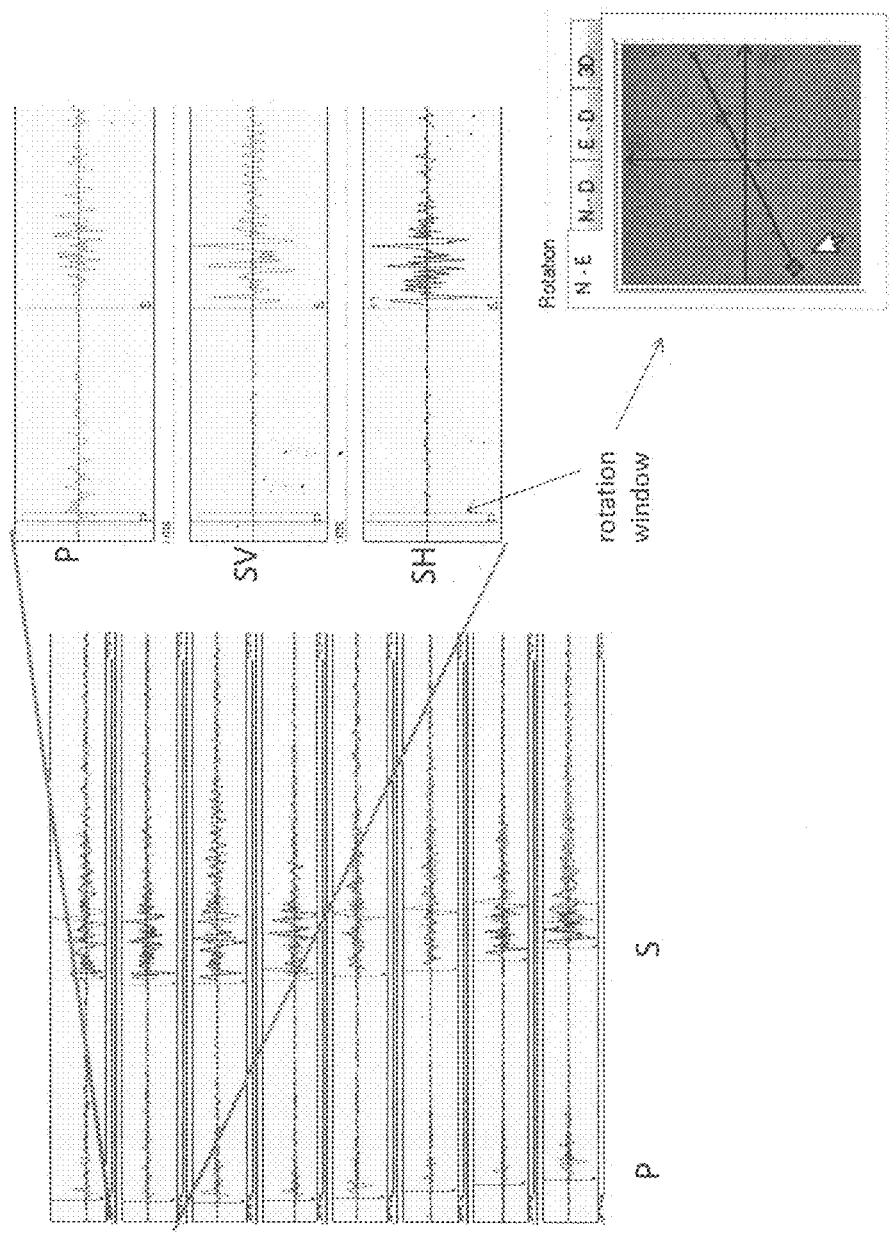
FIG. 7 is a graphical representation of travel time and direction information for individual sensors of FIG. 1 for an example microseismic event identified in FIG. 6 derived from P and S waves utilizing $S_V$ and $S_H$ components.

Referring now to FIG. 7, the sensor data corresponding to the timing of the microseismic events 602 identified in FIG. 6 is analyzed for as many of the sensors 102, 104 as the signal-to-noise ratios will allow. The three-component signal captured by the selected sensor 102, 104 is analyzed to determine the direction the waves are propogating, as well as the source of the microseismic activity. When a P wave pick is available for the sensor 102, 104, the window will be placed after this arrival and the three-components of the particle motion should align with the direction of propagation. For secondary (S) waves, the particle motion in the window will be in a plane perpendicular to the particle motion so the normal vector to this plane can be used to determine the direction of propagation. In example embodiments, only one estimate of the particle motion will be assigned to each sensor, and P wave hodograms are generally preferred to S wave hodograms because they usually have higher signal-to-noise ratios.

Figure 8:
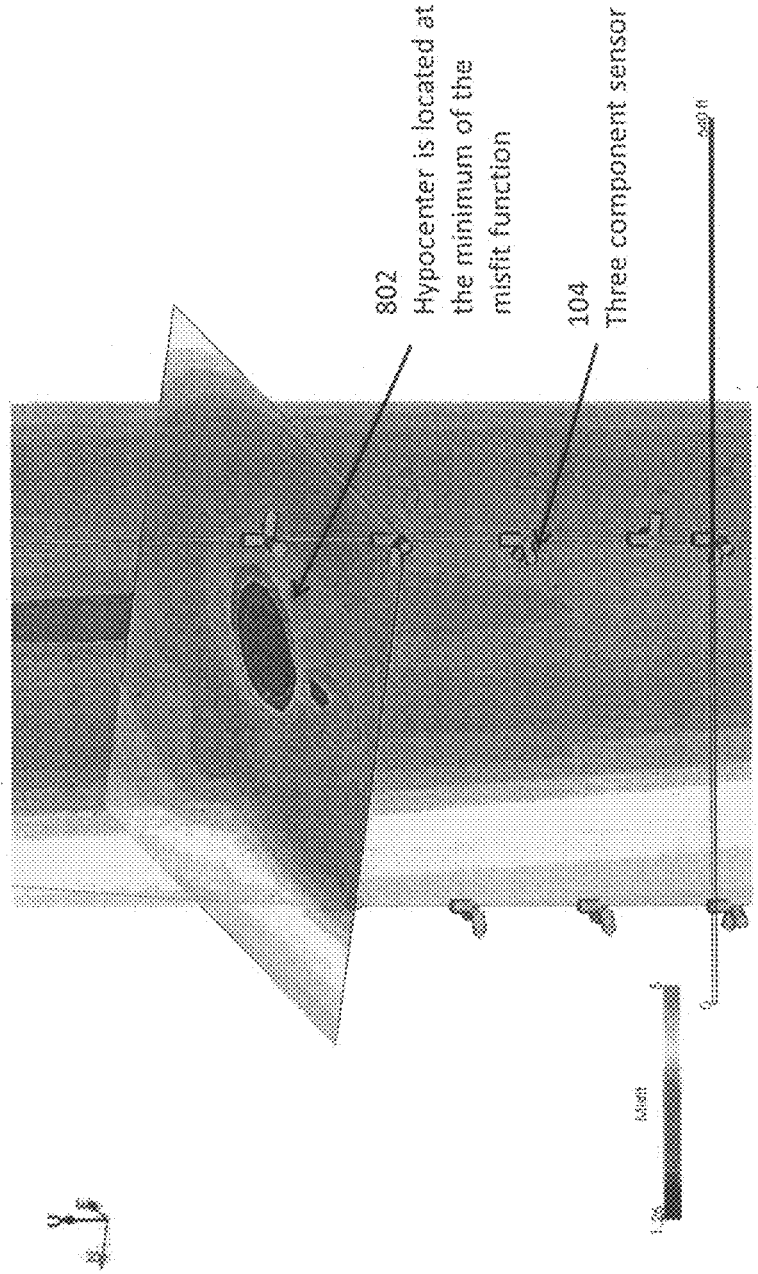
FIG. 8 is a graphical representation of a hypocenter of an example microseismic event derived from travel time and direction information like that shown in FIG. 7.

Referring now to FIG. 8, the objective function is a measure of how well a potential location fits the data measured from the plurality of sensors 102, 104. The objective function is formed according to the description given by Microearthquake Location: A Nonlinear Approach That Makes Use of a Simplex Stepping Procedure (Prugger and Gendzwill, Bulletin of the Seismological Society of America, Vol. 78, No. 2, pp. 799-815, April 1988; the contents of which are incorporated by reference into this detailed description) and modified to include S wave traveltimes and hodogram information. The objective function is searched using the simplex algorithm discussed by Prugger and Gendzwill to find the best fitting location, known as the hypocenter 802, based on the data. For example, a search algorithm is applied to locate the area of least misfit between theoretical information and measured data.

Figure 9:
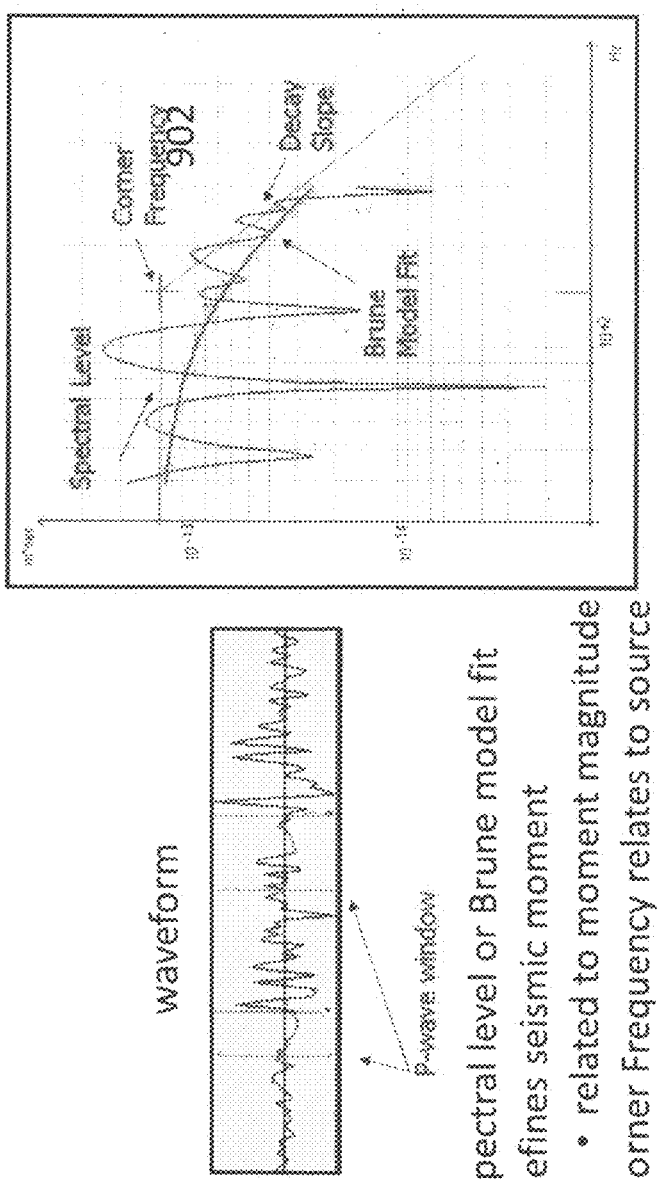

Referring now to FIG. 9, once a hypocenter 802 has been determined, the source parameters can be calculated from the data collected by the sensors 102, 104. Automatic Time-Domain Calculation of Source Parameters for the Analysis of Induced Seismicity (Urbancic et al., Bulletin of the Seismological Society of America, Vol. 86, No. 5, pp. 1627-1633, October 1996; the contents of which are incorporated by reference into this detailed description) outlines the algorithms used to calculate source parameters like seismic moment, energy, corner frequency, and a number of other parameters. Integrals in windows after the P and S waves are calculated in the time domain and related to each of these parameters. In the case of source radius, the corner frequency 902 is related to this parameter like those presented by Tectonic Stress and the Spectra of Seismic Shear Waves from Earthquakes (Brune, Journal of Geophysical Research, Vol. 75, No. 26, Sep. 10, 1970) or Spectra of Seismic Radiation From a Tensile Crack (Walter and Brune, Journal of Geophysical Research, Vol. 98, No. b3, Pages 4449-4459, Mar. 10, 1993), both of which are incorporated by reference into this detailed description. This source radius data is used later in determining the Discrete Fracture Network (DFN).

Figure 10:
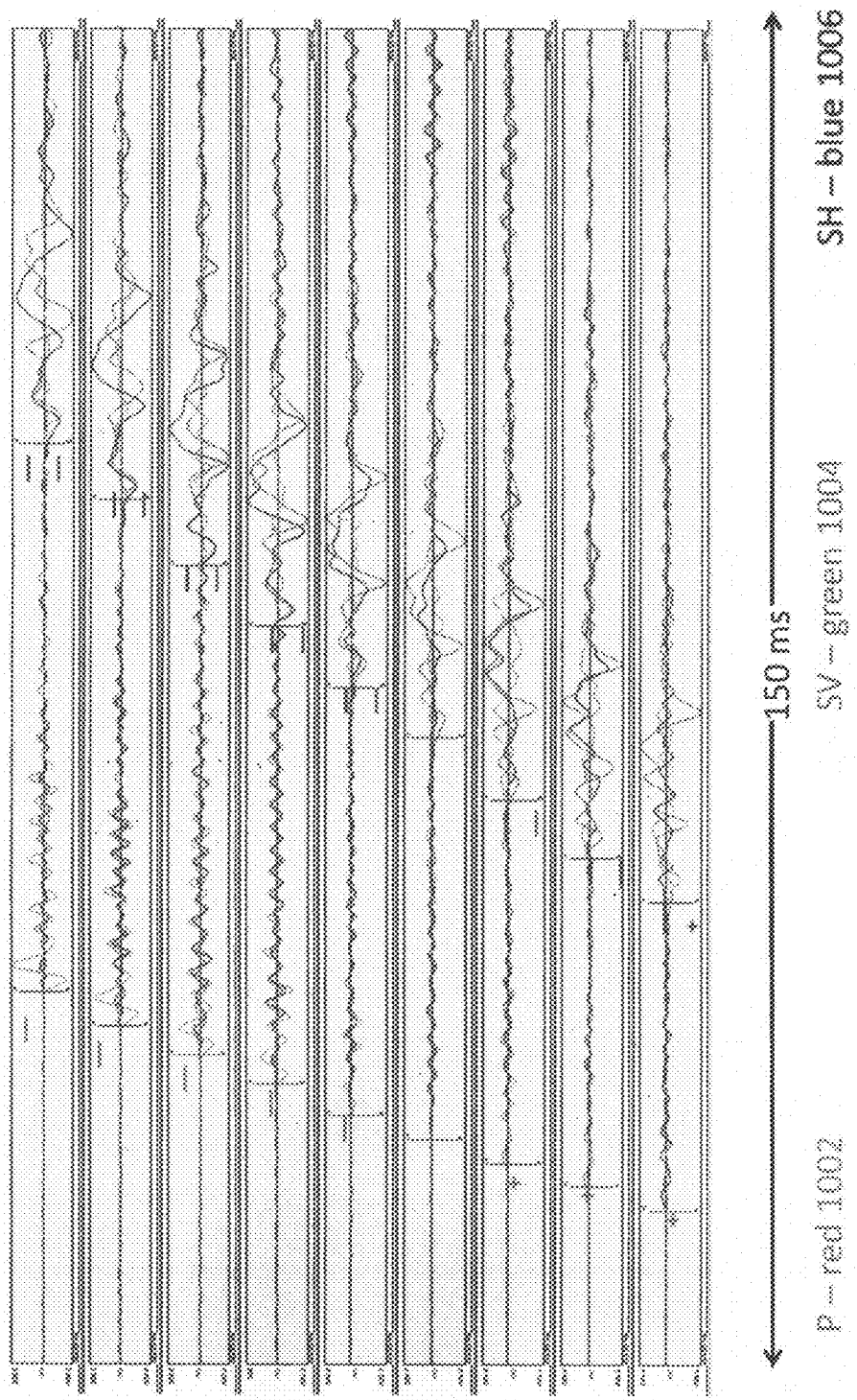
FIG. 10 is a graphical illustration of an example polarity assignment for P, $S_V$, and $S_H$ waves for a microseismic event.

Referring now to FIG. 10, once the hypocenters 802 have been located the moment tensor can be determined by further examining for the polarities and amplitudes of the different seismic phases for each sensor 102, 104. The data collected by the sensors 102, 104 is analyzed to determine its polarity. The S wave motion takes place in a plane perpendicular to the direction of propagations. A common convention is to decompose this plane into SH (horizontal direction) 1006 and SV (perpendicular to SH) 1004. The polarities are measured on each channel with sufficient signal-to-noise ratios, and an uncertainty to this polarization can be assigned. Generally, different phases will be polarized along differing directions, but looking at the onset of these phases, the first motion will be defined as being either positive aligned or negative aligned along these polarization directions.

The data collected by the sensors is also analyzed to determine the amplitude. The amplitudes are in a window following the P 1002, SV 1004 and SH 1006 waves by integrating the waveforms. This polarity and amplitude data of these phases of seismic activity make up the seismic moment tensor, and is the first step in determining the seismic moment tensor inversion (SMTI).

Referring now to FIG. 11A, the velocity model defines how to project the amplitude and polarity data as determined in FIG. 10 back to the hypocentre 802 in order to determine the radiation pattern for P, SV, and SH waves. The waves reflect and refract from the source 802 to the sensors 102, 104 according to the velocity model, and the measured amplitudes and polarities are projected back to the source 802 along these reflecting and refracting raypaths. In FIG. 11A layered velocity model 1100 includes a plurality of layered velocity interfaces 1104 and lines 1102 represent ray paths refracting through the layered velocity module.

Referring now to FIG. 11B, the radiation pattern is the projected P, SV and SH wave polarities and amplitudes projected back to the source. FIG. 11B is a contour plot of the P wave showing positive and negative polarity P waves of FIG. 10 mapped on a focal sphere, with the projection of the applicable sensors on the focal sphere. In particular, a lower hemisphere stereographic projection of the P wave radiation pattern is used to display the moment tensor. White areas 1106 on the plot represent negative polarity P waves; blue (or shaded) areas 1108 on the plot represent positive polarity P waves; symbols 1110 represent projection of the sensors 102, 104 on the focal sphere. With a good spatial sampling around the event, the measured waveform polarities and amplitudes can determine these radiation patterns then determine the moment tensor. An algorithm to perform the moment tensor inversion from waveforms is described in A Fast Evaluation of the Seismic Moment Tensor for Induced Seismicity (Trifu et al., Bulletin of the Seismological Society of America, 90, 6, pp. 1521-1527, December 2000), the contents of which are incorporated by reference into this detailed description.

The moment tensor consists of six parameters, and as such at least six observations of waveform characteristics need to be made to calculate a solution. However, due to the non-uniqueness of waveform characteristics when only observed from one azimuth, the stability of the moment tensor inversion is improved with increased sampled solid angle of the focal sphere created from the projection of the amplitude and polarization directions along the rays back to the source. That is, the better the azimuthal coverage of the observation wells, the higher degree of the focal sphere will be covered and the more robust the moment tensor solution.

To resolve this potential non-uniqueness the sensors are deployed such that a sufficient degree of azimuthal coverage is achieved. This can be accomplished by deploying sensor arrays 105 of sensors 102, 104 in non-producing or non-treatment wells 106, deploying sensor arrays on or near the surface, or any combination of the above. A well 106 providing coverage for more than one azimuth (e.g., a well with a substantial vertical and substantial horizontal component relative to the surface) could also be used. Modeling of the condition numbers of the moment tensor inversion gives an idea of where the moment tensors will behave the most stably. A non-limiting example of sensor array 105 deployment that would provide a sufficient degree of azimuthal coverage can be seen in FIG. 1.

Figure 13:
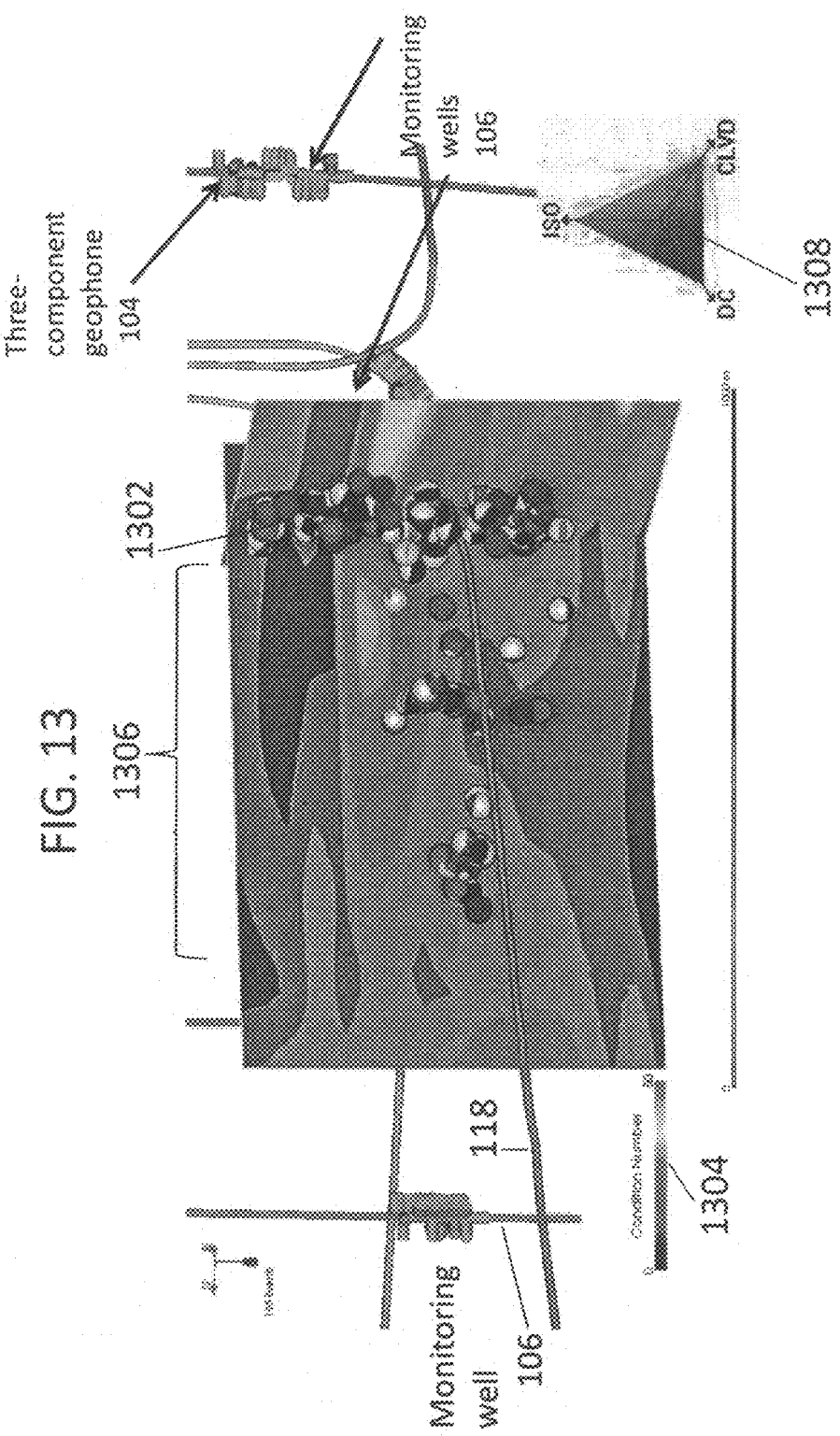
FIG. 13 is graphical representation of an example discrete fracture network model derived from seismic data captured, for example, by the system of FIG. 1 and derived, for example, utilizing the methods and algorithms described with reference to the other FIGS; the events graphically represented as spheres providing event location, source type, source radius, and orientation.

FIG. 12 is a source type plot which can be utilized to graphically illustrate modes of deformation for a set of example seismic events, and the source types associated with locations on the plot. Referring now to FIG. 12, as was discussed above, the moment tensor consists of six parameters. These parameters can be derived from the moment tensor according to the descriptions of Hudson, J. A., Pearce, R. G., Rogers, R. M., (see Source type plot for inversion of the moment tensors. J. Geophys. Res., 94, 765-774, Hudson et al., 1989) and Dufumier, H. and Riviera, L. (see On the resolution of the isotropic component in moment tensor inversion, Geoph. J. Int., Vol. 131, No. 3, pp 595-606, December 1997), the contents of both being incorporated by reference into this detailed description. These six independent components include the size of the event (known as the moment), three parameters describing the orientation of the moment tensor, and two parameters representing the source type (also referred to as the deformation style). The moment tensor source type describes the type of deformation occurring at the moment tensor. This can range from isotropic (ISO), where the deformation is uniformly outward or inward; double couple (DC) where the motion is described by two force couples oriented at right angles to each other resulting in a four-lobed pattern of strain directed outwards and inwards around the event (examples of shear dislocation DC Mode II crack and Mode III cracks are illustrated by blocks 1204A and 1204B); or compensated linear vector dipole (CLVD) where strain is directed outward along one axis and inwards along two axes (or vice versa) in such a way that there is no net volume increase of the moment (as represented by 1206 in FIG. 12). For instance, a combination of isotropic and CLVD mechanisms at the moment tensor represent a style of deformation consistent with the opening or closing of a fluid filled fracture in the medium, whereas a purely double-coupled event is representative of a sliding motion of the fracture. As illustrated in FIG. 12, the vertical axis k represents measure of dilatational component, wherein: k=1 explosive k=−1 implosive and k=0 no volume change; and horizontal axis T defines geometry +/−CLVD; 1−|k| represents measure of deviatoric component Referring now to FIG. 13, once these source mechanisms, or moment tensors, have been determined, they can be related to modes of failure. FIG. 13 is graphical representation of an example moment tensor distribution derived from seismic data captured, for example, by the system of FIG. 1 and derived, for example, utilizing the methods and algorithms described with reference to the other FIGS; the events graphically represented as spheres 1302 provide event location, source type and orientation. Each sphere 1302 represents a moment tensor, each of which is associated with a measured event. The seismic moment tensor inversion is accomplished by building a matrix that describes the inversion. The condition number 1304 is the ratio of the largest to the smallest eigenvalue and it is a measure of the stability of the inversion. In the FIG. 13, the light blue colours of the condition number field 1306 indicate that in these regions the moment tensors will be very well-resolved. In FIG. 13, the condition number field is presented as two intersecting planes of colour representing three dimensions. The relative coloring of the spheres 1302 themselves represent the moment tensor source type (ISO, DC, CLVD) as indicated by color coordinate system 1308. If an inversion is poorly conditioned, the condition numbers are very high (greater than around 50) and the solution is very non-unique, meaning that several moment tensors can equally satisfy the measured waveform polarities and amplitudes. The best conditioned events are then selected for further analysis. If events are poorly conditioned, the moment tensors can be estimated by constraining the solution to not have any volumetric component (the deviatoric solution) or, furthermore constrain the mechanisms to be double couple mechanism (i.e. slip on a fracture plane). By constraining the solutions these mechanisms will be better conditioned (and therefore more stable) and the condition number for these constrained mechanisms can be modelled as well.

FIG. 14A is table representation of microseismic deformation styles, and corresponding moment tensors and fracture models, as represented by spheres 1302. Referring now to FIG. 14A, the SMTI can be used to describe the orientation of a moment tensor corresponding to the pressure (P) and tension (T) axes. The SMTI can also be used to describe the orientation of a moment tensor on fault plane solution, which is the two planes 45 degrees from the P and T axes that intersect at the B axis (corresponding to the middle eigenvector). For a double couple event, the fracture plane will be one of these fault plane solutions. Furthermore, the fracture plane is determined to be the plane that best agrees with the inverted stress parameters. An Improved Method for Determining the Regional Stress Tensor Using Earthquake Focal Mechanism Data: Application to the san Fernando Earthquake Sequence (Gephart and Forsyth, Journal of Geophysical Research, Vol. 89, No. B11, Pages 9305-9320, Oct. 10, 1984), the contents of which are incorporated by reference, describe how to determine the principle stress axes for an area from a number of double couple moment tensors. These axes vary with time and space so a nearest neighbour algorithm is used to determine which events to use in a given part of the treatment volume for a given time window. Gephart and Forsyth also describe how to disambiguate the fracture plane from the other nodal plane for double-couple events. Shear moment tensors have two equally valid solutions for the fracture plane; in an example embodiment, the ambiguity is resolved using the methodology of Gephart and Forsyth. A number of shear moment tensors proximal in space and time, can be inverted for the orientations of the principle stress axes. Once these stress axes are known, then for each of those shear events, one nodal plane will be more likely than the other.

Figure 15C:
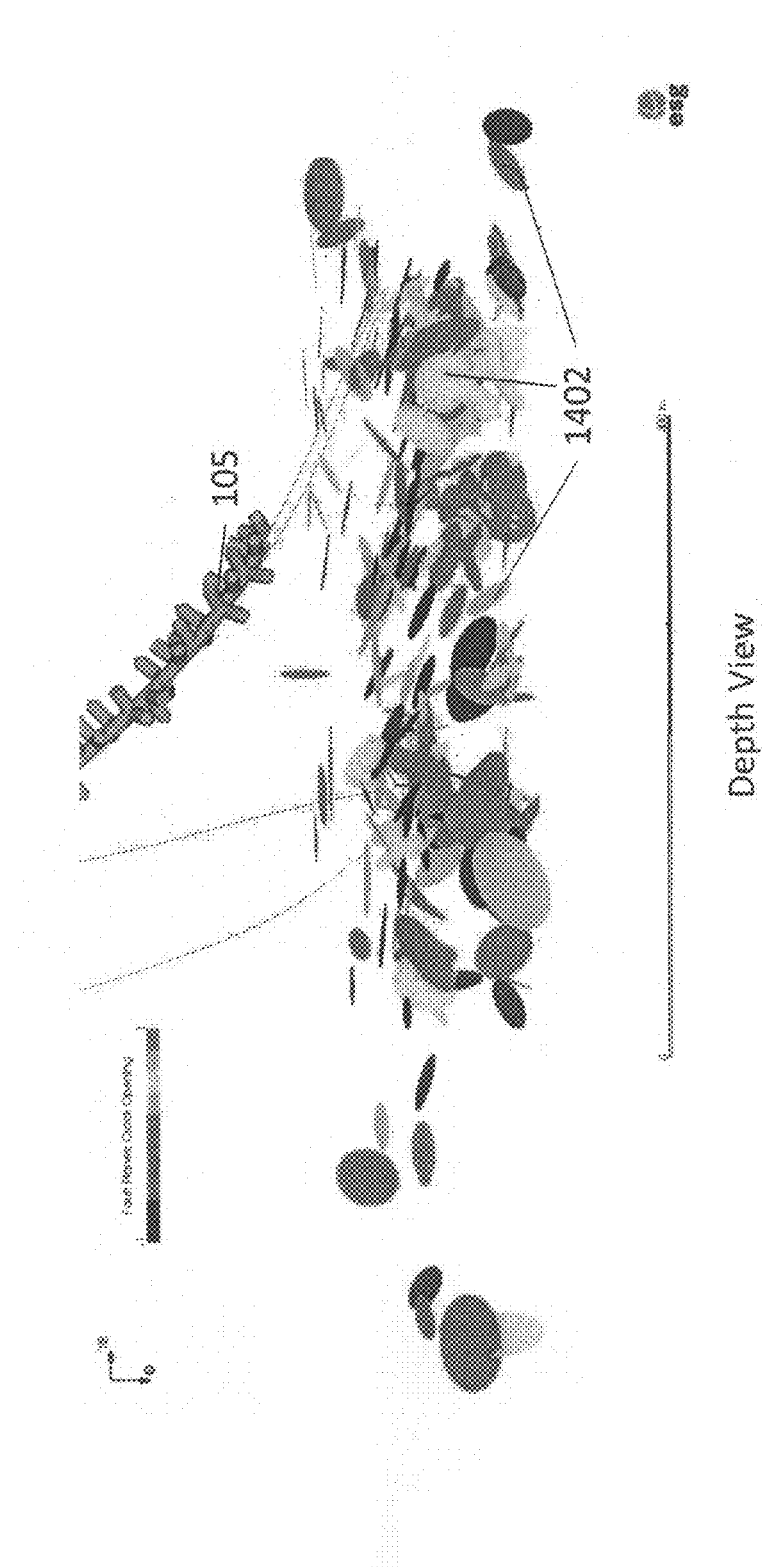

Referring now to FIG. 14B, a graphical representation 1400 of an example partial discrete fracture network (DFN) model is shown. The DFN model for example may be derived from seismic data captured, for example, by the system of FIG. 1 and derived, for example, utilizing the methods and algorithms described with reference to the other FIGS; the events graphically represented as penny shaped circles or cracks 1402 provide event location, source type, source radius, and orientation. Event location is provided by the scaled location of the corresponding circle 1402 on the plot of model 1400; source type for the event is provided by the colour of the circle 1402 (red corresponding to opening deformation style; blue corresponding to closure deformation style and green corresponding to shear deformation style; colours resulting from different combinations of the above colors are used to represent combined deformation styles); source radius for the event is represented by the diameter of the circle 1402 that represents the event; and source orientation for the event is represented by the orientation of the representative circle 1402. The discrete fracture network (DFN) model is generated using the location and orientation of the seismic event (as determined through the SMT analysis) and combining it with the source radius information (i.e., location and estimated radius) determined earlier from the data collected by the sensors 102, 104. This information can be mapped to a graphical representation 1400 of the reservoir and the graphical representation 1400 can be output to an output device, such as a display or printer. FIGS. 15A, 15B and 15C illustrate further examples of DFN models mapped to graphical representations, with FIGS. 15B and 15C showing plan and depth views respectively.

Figure 16:
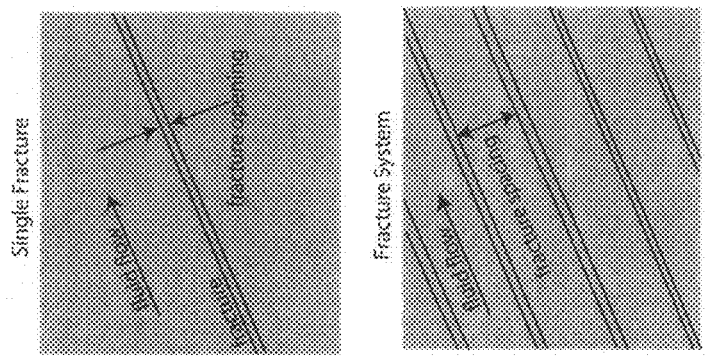
FIG. 16 is provides a graphical illustration of a single fracture illustrating an example fracture opening and direction of fluid flow, and a graphical illustration of a fracture system illustrating a plurality of fractures and fracture spacing.

Referring now to FIG. 16, the DFN model provides insight into fracture orientations and spacing. FIG. 16 provides a graphical illustration 1602 of a single fracture illustrating an example fracture opening and direction of fluid flow, and a graphical illustration 1604 of a fracture system illustrating a plurality of fractures and fracture spacing. Each fracture enhances permeability of the rock. Permeability of a single fracture is proportional to the fracture opening (power of two). For predicting the flow in the reservoir, permeability of the fractured rock is required. Permeability of a fractured rock is proportional to the fracture opening (power of three) and spacing between fractures. The aperture of the fracture can be calculated knowing the surface area of the individual fracture and by taking the moment tensor and determining the total deformed volume, as shown by Müller (Volume Change of Seismic Sources from Moment Tensors, Bull. Seism. Soc. Am., Vol 91, No. 4, pp. 880-884, August 2001, the content of which is incorporated by reference into this detailed description). The proximity and orientation of the fractures, then, can be used to determine the permeability of the rock as shown by Guest and Settari (Relationship Between the Hydraulic Fracture and Observed Microseismicity in the Bossier Sands, Tex., Canadian Unconventional Resources and International Petroleum Conference, 19-21 October, 2010, Calgary, Alberta, Canada, the content of which is incorporated by reference into this detailed description).

Figure 17:
FIG. 17 is a graphical representation of a stimulated reservoir volume model derived, for example, from the discrete fracture network model represented in the earlier FIGS.

Referring now to FIG. 17, the DFN model, source radius, and SMT data can be used to determine the stimulated reservoir volume (SRV). FIG. 17 is a graphical representation of a stimulated reservoir volume model derived, for example, from the discrete fracture network model represented in the earlier FIGs. Guest and Settari (Relationship Between the Hydraulic Fracture and Observed Microseismicity in the Bossier Sands, Texas, Canadian Unconventional Resources and International Petroleum Conference, 19-21 Oct., 2010, Calgary, Alberta, Canada, the content of which is incorporated by reference into this detailed description) show how to translate a description of similarly oriented cracks with different apertures of opening into a permeability enhancement. Therefore calculation of the moment tensor's opening apertures, spacings and orientations facilitates the calculation of the permeability enhancement for a given gridpoint in the treatment volume. A fracture set is determined by searching for a number of events within a radius of a grid point with similar orientations. Since there can be several fracture sets within a specified radius of the gridpoint, the individual permeability enhancements are calculated for each set and then added together. The permeability enhancement can also be thought of as an enhancement of fluid flow (EFF) in a volume that prior to stimulation would not have been amenable to fluid flow. The volume enclosed by this envelope is an estimate of the SRV.

Figure 18:
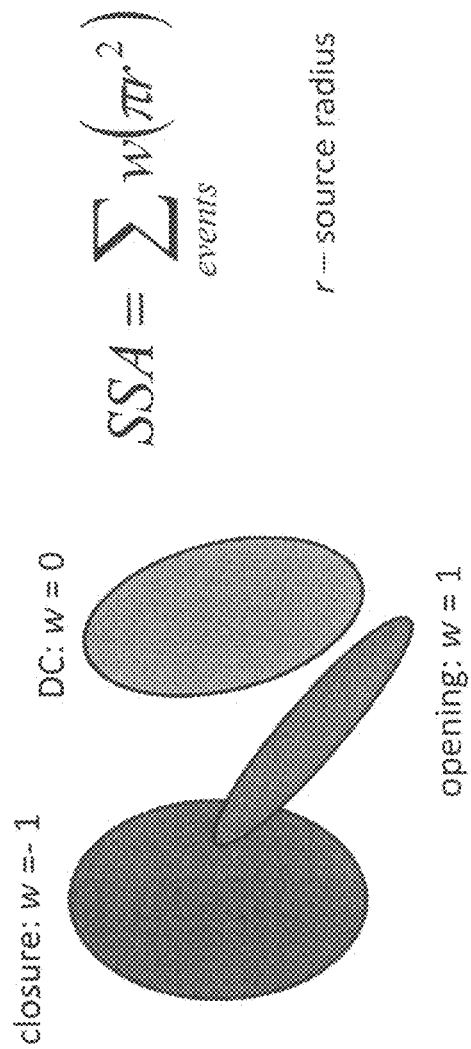
FIG. 18 is a schematic representation of the Stimulated Surface Area calculation. The total SSA in a volume is given by summing, for each event, a weighting factor based on whether the events are opening, closing, or shearing multiplied by the surface area of the fracture (estimated from pi times the source radius squared).

Referring now to FIG. 18, the DFN model and SMTI data can be correlated to determine the Stimulated Surface Area (SSA) caused by the hydraulic fracturing. FIG. 18 is a schematic representation of the Stimulated Surface Area (SSA) calculation. The total SSA in a volume is given by summing, for each event, a weighting factor based on whether the events are opening, closing, or shearing multiplied by the surface area of the fracture (estimates from pi times the source radius squared). The stimulated surface area is calculated knowing the source radius to calculate a fracture surface area ($\pi \times [\text{source radius}]^2$) with a weighting factor representing opening (positive) or closure (negative) from the source-type parameters of Hudson, J. A., Pearce, R. G., Rogers, R. M., 1989. Source type plot for inversion of the moment tensors. J. Geophys. Res., 94, 765-774 Hudson et al. (1989), the content of which is incorporated by reference into this detailed description. The weighting factor is assigned to each fracture based on whether it represents a crack opening (+1), a DC event (0), a closure event (−1), or a mixed mode or failure between DC and opening or closing interpolated between 0 and ±1. Adding together the weighted surface areas from all the fractures in a volume gives an estimate of the SSA in a region of the reservoir, adding together all the weighted fracture areas yield the SSA from the entire treatment zone.

Figure 19:
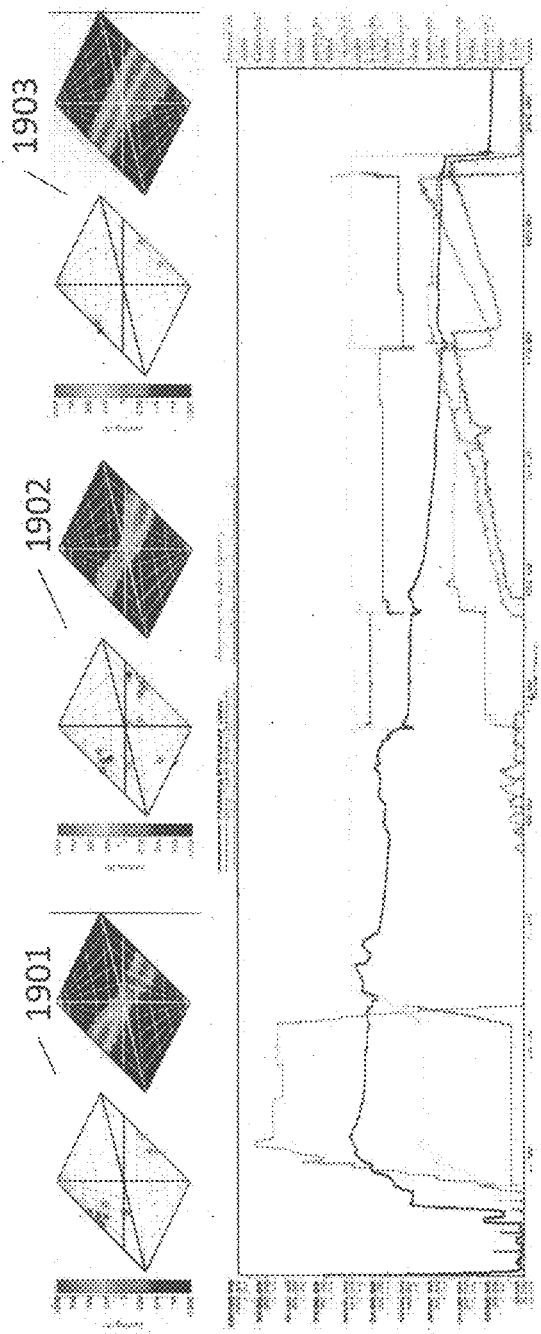
FIG. 19 is a series of source type plots such as explained for FIG. 12, showing the effects of hydraulic fracturing on the well, and providing engineers with feedback as to whether the additional fracturing leads to diminishing returns; for example plot 1 introduction of nitrogen into the stimulation well promotes opening events, plot 2 reduction of nitrogen, shows transition to closure events, and plot 3 reintroduction of nitrogen provides further opening events.

Referring now to FIG. 19, information regarding the point of diminishing returns can be determined by correlating engineering data obtained during the hydraulic fracturing process with the SMTI data. Such a correlation can be performed by a hydraulic fracturing engineer, or alternatively embodied in an automated algorithm. The SMTI data provides variations in the source-type distribution over time with regard to the microseismic events caused by the hydraulic fracturing process. Relating these mechanisms with engineering data (for example, pressure, temperature, proppant concentration, fluid viscosity, fluid type, and injection rate) used during the hydraulic fracturing process provides data regarding how the fracture is responding to the hydraulic fracturing. That is, the SMTI data describes how the events are opening fractures in the treatment zone: the hydraulic fracture process seeks to create cracks in a reservoir and pump fluids and proppant into these cracks to enhance the permeability of the reservoir. Comparison of the event distribution, including whether the events represent opening or closing of fractures, with the parameters such as bottom hole pressure, proppant concentration, proppant composition, fluid density, fluid flow rate, etc. will indicate where and how the formation is responding to this treatment. When more closure events than opening events are observed using the moment tensor analysis, then the treatment is said to have reached a point of diminishing returns (PDR) whereupon a change in the treatment is necessary to continue the growth of the treatment zone. The PDR can then be used to predict the behavior of similar fractures or suggest changing the fracturing parameters (e.g., fluid type, proppant concentration, etc) to enhance the effectiveness of the hydraulic fracturing process. FIG. 19 is a series of source type plots such as explained for FIG. 12, showing the effects of hydraulic fracturing on the well, and providing engineers with feedback as to whether the additional fracturing leads to diminishing returns; for example plot 1901 introduction of nitrogen into the stimulation well promotes opening events, plot 1902 reduction of nitrogen, shows transition to closure events, and plot 1903 reintroduction of nitrogen provides further opening events.

Figure 20:
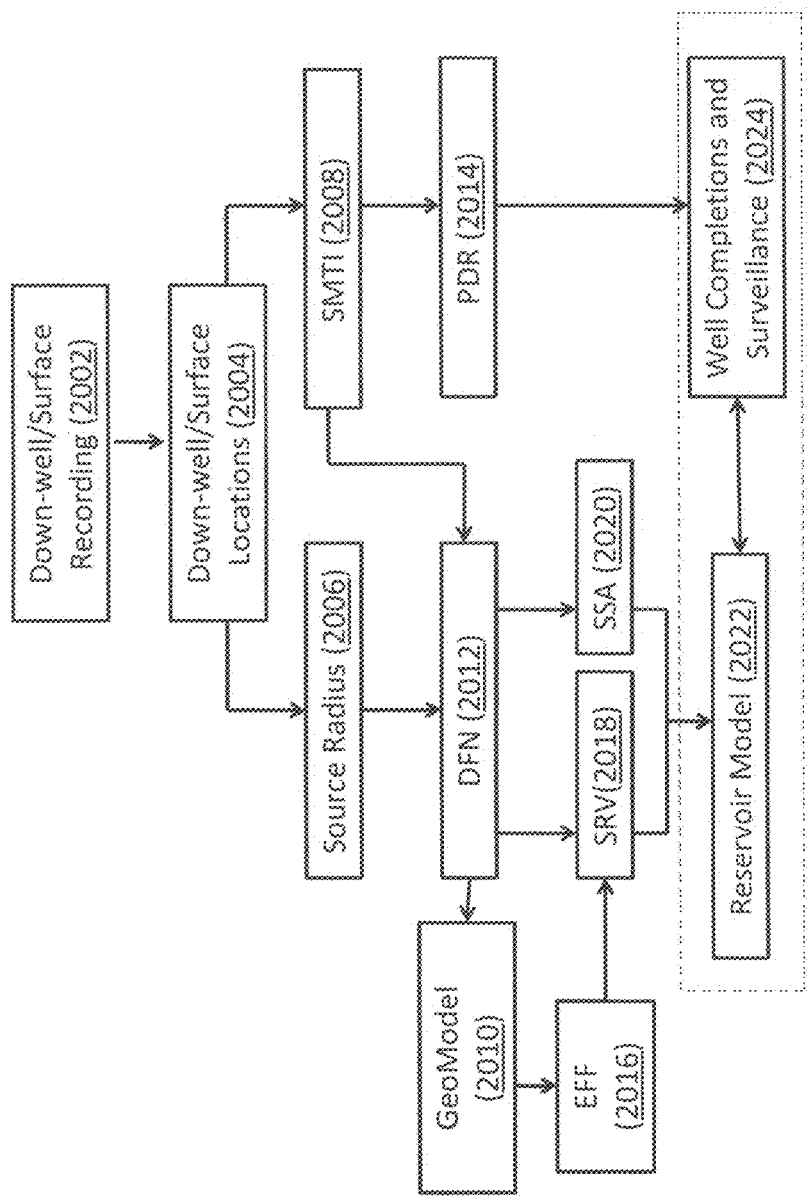
FIG. 20 is a block diagram summarizing a method of modeling microseismic events according to embodiments of the present invention.

The above described figures and description illustrate how hydraulic fracturing can be modeled and graphically represented on an output device. The methods will now be reviewed with reference to FIGS. 20-28. Referring now to FIG. 20, a summary of the method is provided. Three-component sensors 102, 104 deployed down-well and/or on the surface record microseismic activity (Actions 2002 and 2004). This recorded data is then processed to determine the source radius and SMTI information of the seismic event (Actions 2006 and 2008). The source radius and SMTI information are used to determine the DFN (Action 2012).

The DFN, in conjunction with SMTI information, can be used to determine the SRV and SSA of the reservoir (Actions 2018 and 2020). The DFN and SMTI information can also be used to generate the GeoModel and EFF (Actions 2010 amd 2016). This information can then be used to model the reservoir (Action 2022), monitor the well (well surveillance), and determine whether the well is ready for production (well completion) (Action 2024). The various actions in FIG. 20 will now be reviewed in greater detail with reference to the remaining Figures.

Figure 21:
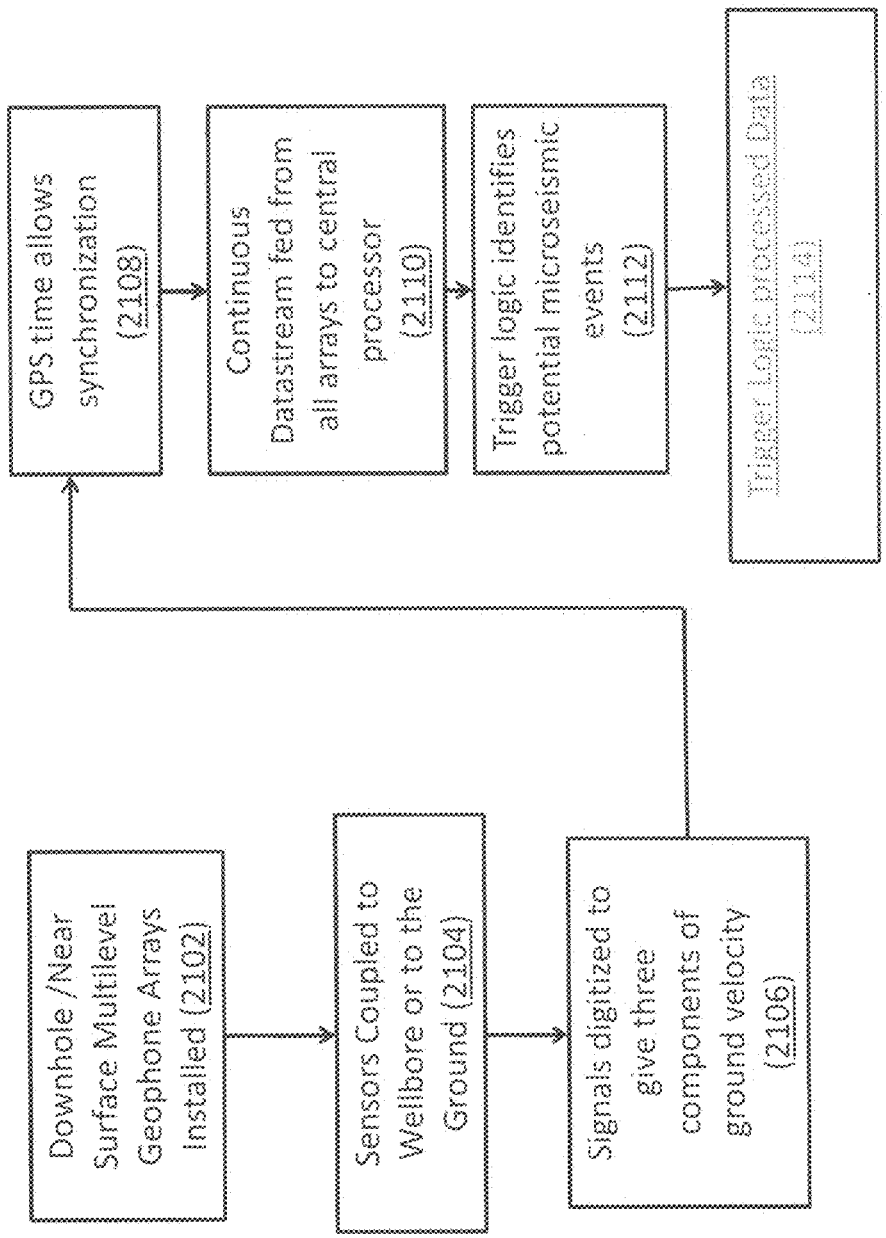
FIG. 21 is a block diagram illustrating an example of how sensors can be used to collect microseismic data.

FIG. 21 provides an example embodiment of how three component sensors 102, 104 such as geophones can be used to record microseismic data, and how microseismic events can be identified from this recorded data. Three component geophone arrays are deployed downhole or near surface, the sensors being coupled to the borehole or ground (Actions 2102, 2104). The sensors are oriented as described above in respect of FIGS. 4A and 4B. The sensors 102, 104 detect microseismic activity, which is comprised of three components of ground velocity (digitized at digitizers 110) (Action 2106). This data is then time synched with GPS time (from GPS devices 112) (Action 2110) and transmitted to a central processor 108 (Action 2110). Trigger logic such as the STA/LTA logic described above in conjunction with FIGS. 5 and 6 is then used to identify potential seismic events (Action 2008), and the resulting trigger logic processed data 2114 is then further processed as shown in FIG. 22.

Figure 22:
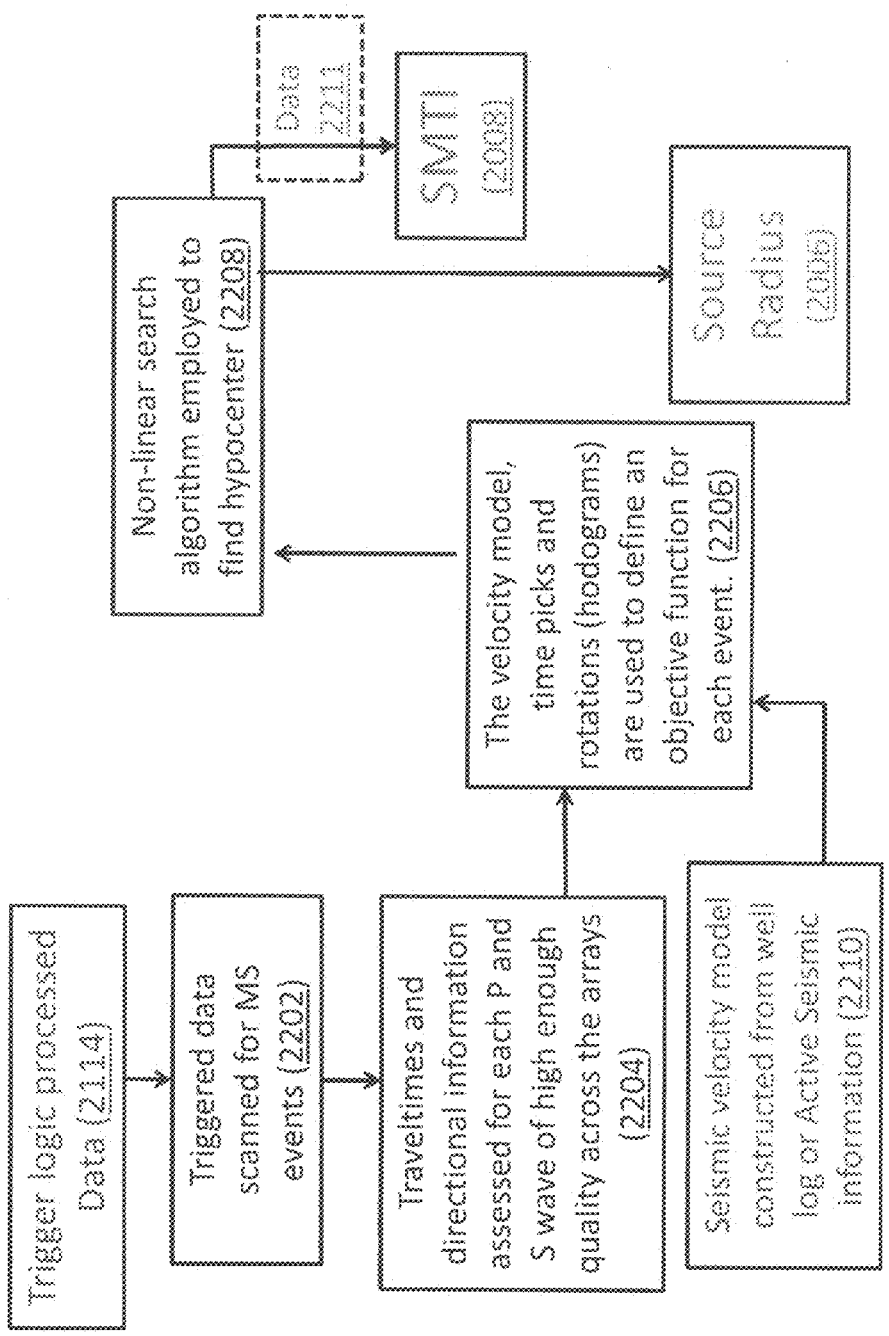
FIG. 22 is a block diagram illustrating an example of how to determine source radius data from trigger logic processed data.

FIG. 22 describes how the source parameters including the source radius 2006 are determined from the trigger logic processed data 2114. Once the data has been processed using the trigger logic as seen in FIG. 21, travel times and directional information for each primary (P) and secondary (S) wave can be determined for those microseismic events determined by the trigger logic (Action 2204). Seismic velocity model information 2210, which provides information regarding the geographic composition of the reservoir, is then incorporated. The objective function for each microseismic event is then determined using the velocity model, the time picks, and the rotations (hodograms) (Action 2206). A nonlinear search algorithm is then used to find the hypocenter of the microseismic event (Action 2208). This results in a set of source radius parameters 2006 associated with the seismic event including, but not limited to, the estimated moment (magnitude) and the source radius. The resulting data 2211 of the nonlinear search are also used in determining the SMTI 2008 as described in further detail below. The method of FIG. 22 corresponds to the activities described above in respect of FIGS. 7-10.

Figure 23:
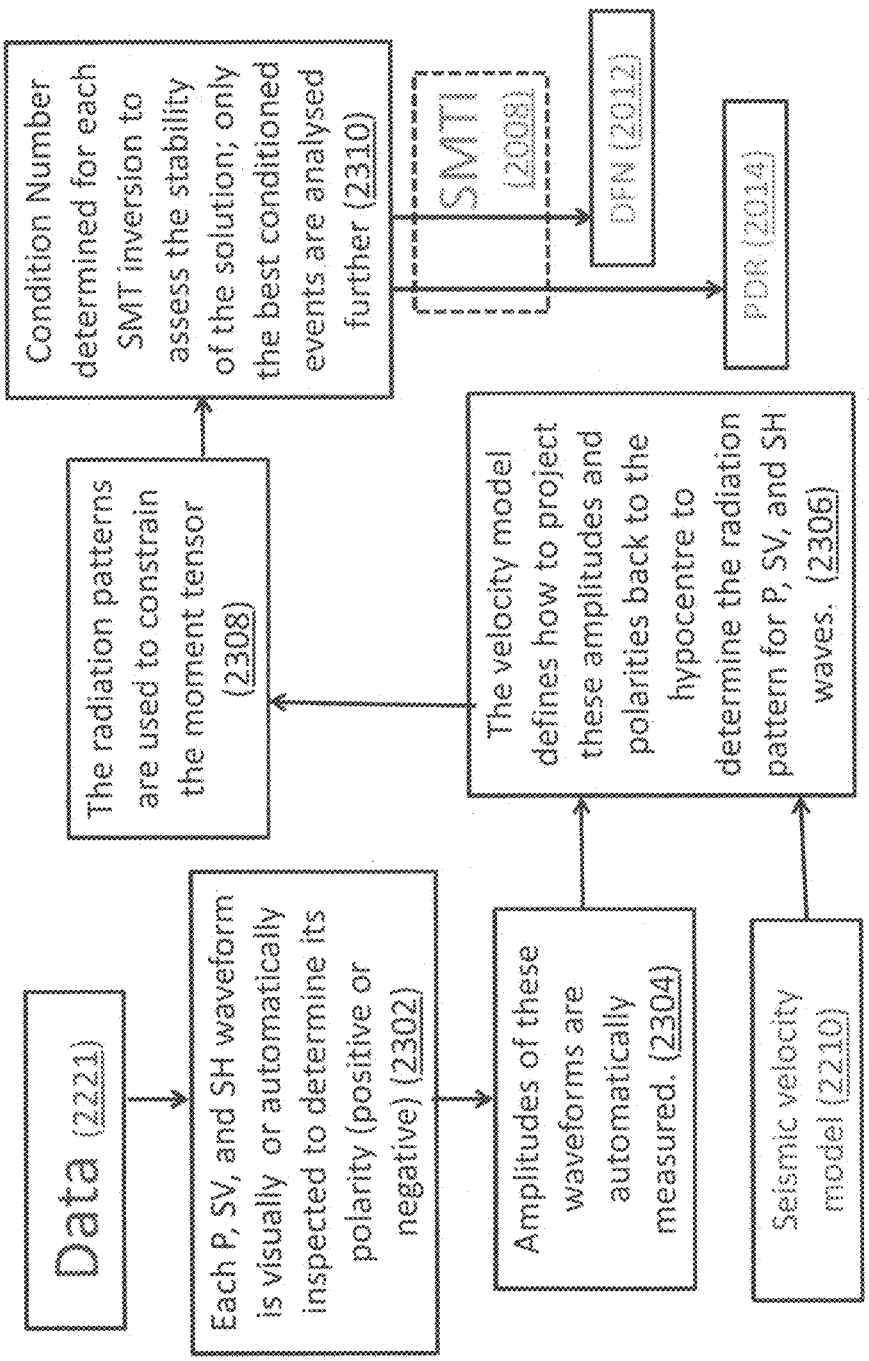
FIG. 23 is a block diagram illustrating an example of how to determine the SMTI from data processed using a non-linear search algorithm to determine the hypocenter of the microseismic event.

FIG. 23 describes how to determine the SMTI data 2008 from the data 2211 processed by the nonlinear search algorithm 2208. Each P, SH, and SV waveform is assigned a polarity as described above in respect of FIG. 10 (Action 2302), and the amplitude of these waveforms are also determined (Action 2304). This information is correlated with the seismic velocity model 2210 to determine how to project the amplitude and polarity data back to the hypocenter to determine the radiation pattern of the P, SV, and SH waves from the hypocenter (Action 2308) as described above in respect of FIG. 11A. The radiation patterns are then used to constrain the moment tensor (Action 2308) as described above in respect of FIG. 11B, and a condition number is determined for each SMT inversion to assess the stability of the solution (Action 2310). The well-conditioned events are then selected as SMTI data 2008 to be analyzed further, as described below.

Figure 24:
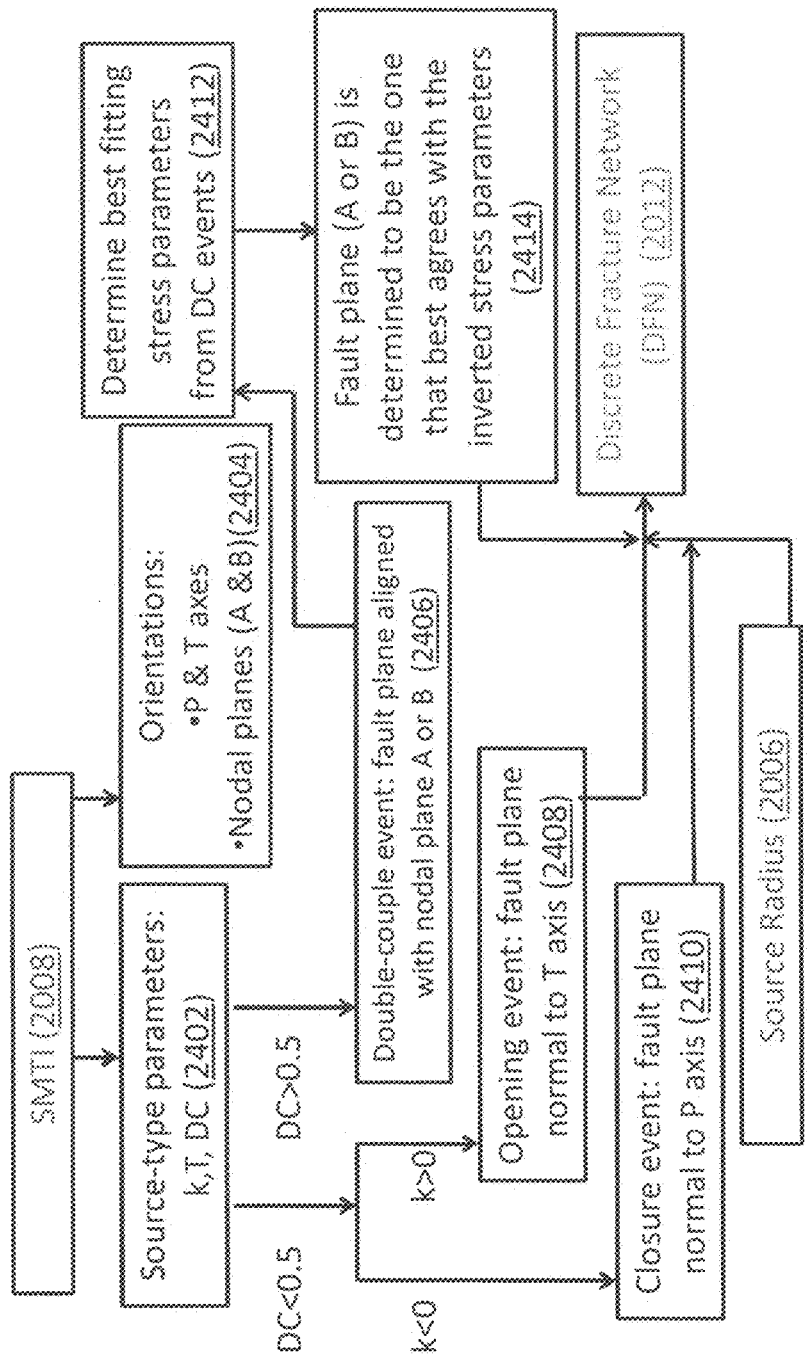
FIG. 24 is a block diagram illustrating an example of how to determine the DFN model using SMTI and source radius information.

FIG. 24 describes how the DFN model 2012 is determined using the source radius data 2006 from FIG. 22 and the SMTI data 2008 from FIG. 23. The SMTI data 2008 includes both orientation and source-type parameters 2402 for the seismic moment. The source type parameters are analyzed to determine whether the DC (double couple) parameter is greater than or less than 0.5. If the DC value is greater than 0.5, then the event was a double-couple (DC) event (Action 2406) and further analysis must be performed to determine the fault plane. The fault plane will be determined by analyzing which stress parameters best fit the DC events (Action 2412), and the fault plane will be the nodal plane that best agrees with the inverted stress parameters (Action 2414).

If, however, the DC parameter is less than 0.5, then the data is further analyzed to determine whether the k parameter is greater than or less than 0. If the k value is greater than 0, then this corresponds to an opening event and the fault plane will be normal to the tension (T) axis (Action 2408). If the k value is less than 0, then this corresponds to a closing event, and the fault plane will be normal to the pressure (P) axis (Action 2410).

Once the fault plane has been determined using one of the two procedures described above, this information is combined with the source radius data to arrive at the DFN model 2012. The DFN model 2012 includes information regarding fracture orientations and spacing, for example, as described above in respect of FIGS. 14B and 15A-15C.

Figure 25:
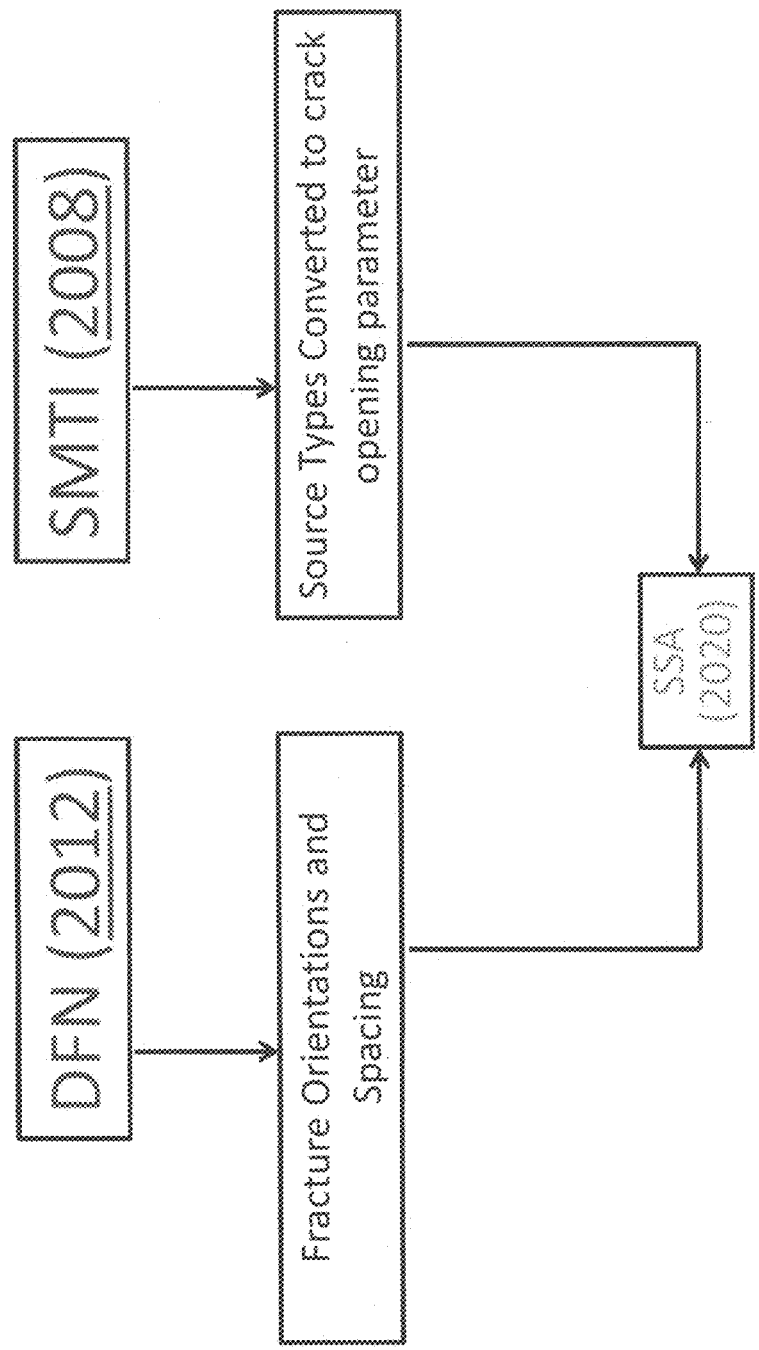
FIG. 25 is a block diagram illustrating an example of how to determine the stimulated surface area of a reservoir by using the DFN model and SMTI data.

Referring now to FIG. 25, the stimulated surface area (SSA) 2020 can be determined by correlating the fracture orientations and spacing from the DFN model 2012 with the source type information obtained from SMTI data 2008.

Figure 26A:
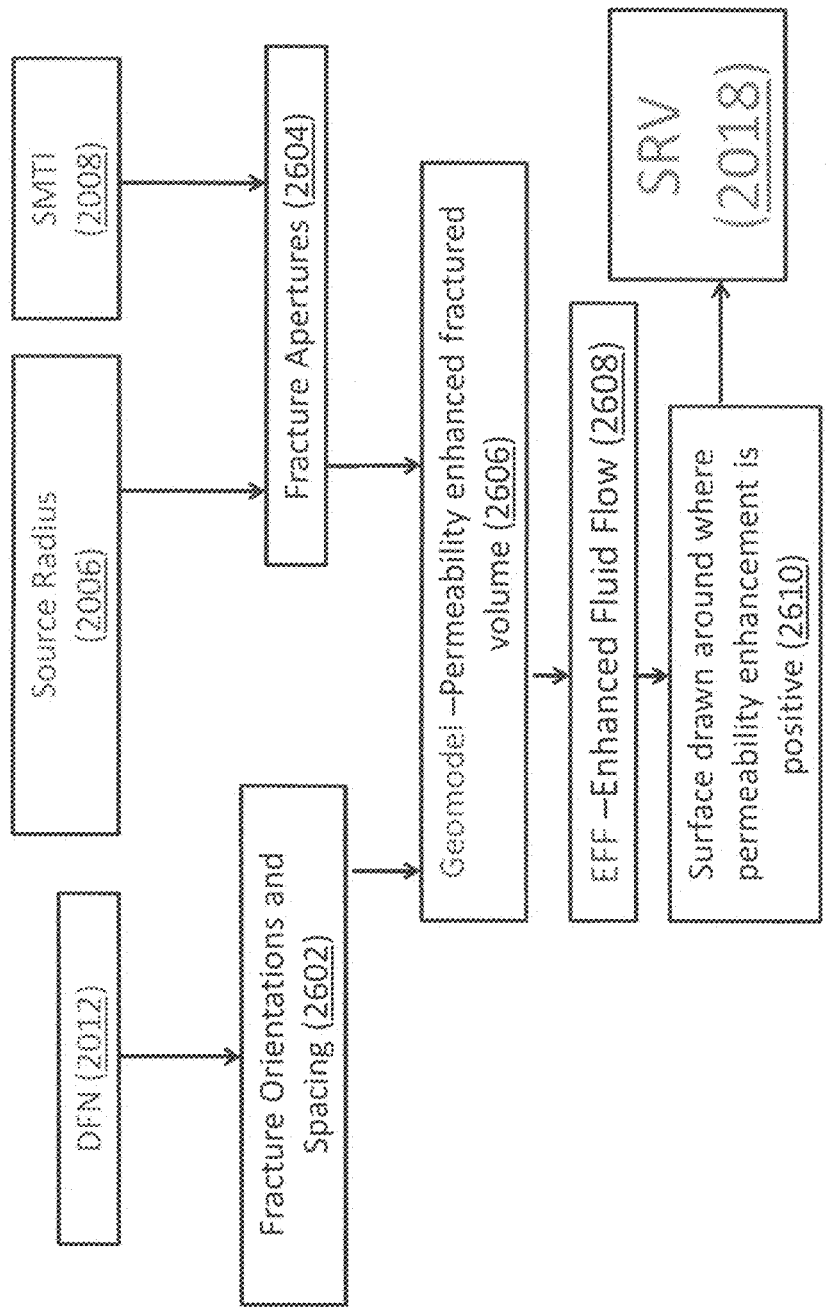
FIGS. 26A and 26B are block diagrams illustrating examples of how to determine the stimulated reservoir volume (SRV) of a reservoir by using the DFN model, SMTI data, and source radius data.

Referring now to FIG. 26A, the stimulated reservoir volume (SRV) 2018 can also be determined using the DFN 2012, source radius 2006, and SMTI data 2008. The source radius 2006 and SMTI 2008 provide information regarding the fracture apertures 2604, whereas the DFN model 2012 provides information regarding the fracture orientations and spacing 2602. This data is used to determine a Geomodel of the permeability enhanced fractured volume 2606. This can then be used to determine the Enhanced Fluid Flow (EFF) 2608. By drawing a surface around where the permeability enhancement of the reservoir is positive (Action 2610), the stimulated reservoir volume SRV 2018 can be determined.

Figure 26B:
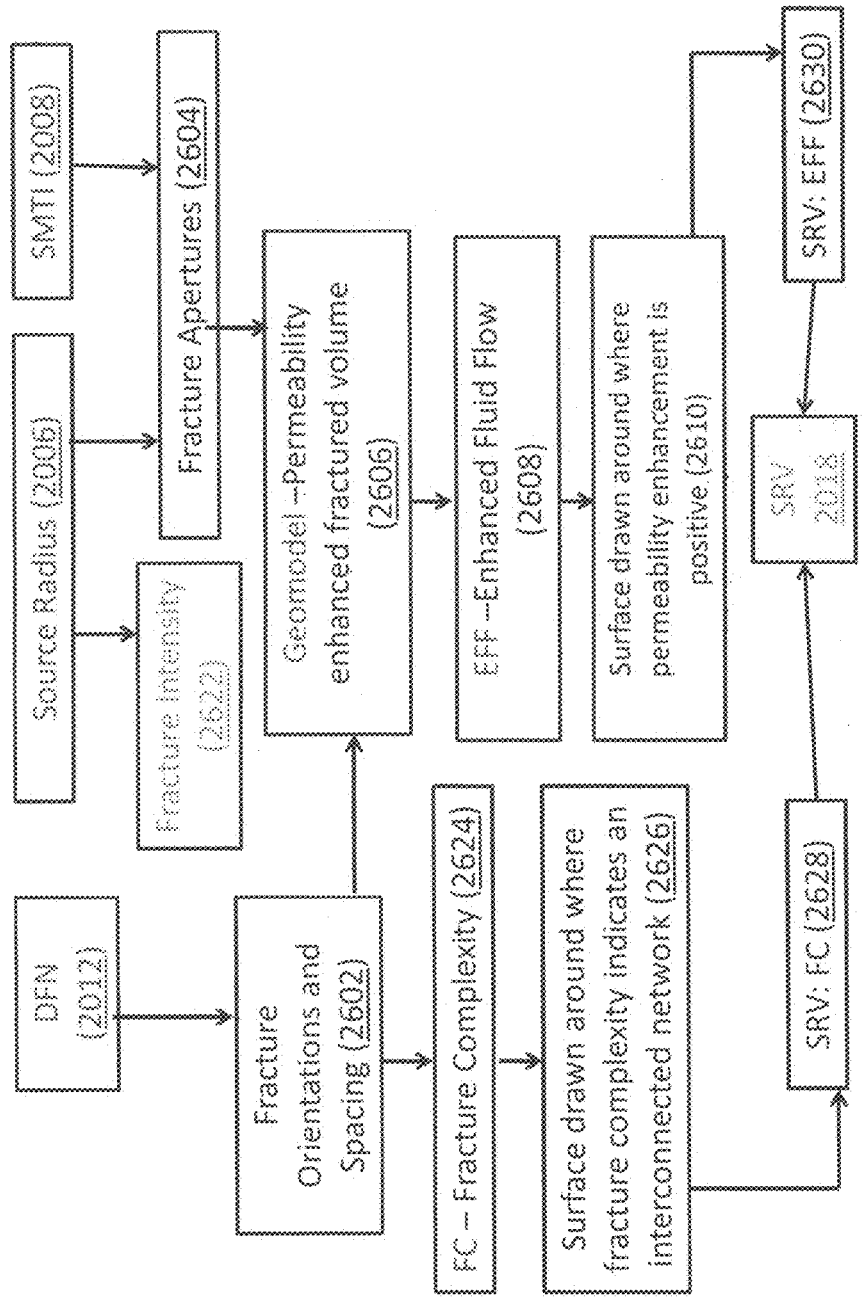

FIG. 26B shows a method determining SRV 2018 that is similar to that of FIG. 26A, with additional actions 2624 and 2626 according to an example embodiment. In the method of FIG. 26B, fracture intensity 2622 is determined as well as fracture complexity 2624. Fracture intensity 2622 is a measure of the cumulative fracture length per unit area or volume in a part of the reservoir. This is a parameter than can be estimated through analysis of 3D seismic profiling, and is expressed as the total length of fractures over a given area. The microseismic data allows an estimate of fracture intensity to be determined by summing the source diameters (i.e. twice the source radius) in a nearest neighbor area of a grid point. The source radii 2006 of the fractures will generally follow a power law distribution that can be described by a constant slope on a log-log plot of number of events versus source radius. However, this view may not hold at all scales, as the size of the fractures is controlled by the structures within the rock itself, the fracturing will tend to terminate when it encounters a barrier, like another intersecting fracture. Since the fracture network 2012 is comprised of a number of these different key blocks, a determination of these source radii 2006 can lead to estimates of these key block sizes, which can then be used as a component of the reservoir model.

Fracture complexity is a quantity that is measured from the DFN 2012, which consists of variously oriented fractures with sizes determined from the spectral response of the event. The complexity is estimated from the number of intersections formed in the DFN 2012 —a very complex network with closely spaced fractures of varying azimuths will have many intersections. To see if two events intersect, the line of intersection between the fracture planes of the two events is calculated. So long as the fractures are not exactly parallel, there will be a line of intersection of the two planes. If the distance to the line from the points is within the source radius for the events, then there is an intersection. Tallying these intersections of nearest neighbor events to a grid point allows for the complexity to be calculated.

To compensate for events that may not have been recorded, the fracture complexity 2624 is calculated by premultiplying each source radius 2006 by a constant factor, which results in having more intersections. By dividing this exaggerated number of intersections by the same factor, the complexity of the relative complexity of the fracture network 2012 can then be assessed.

The fracture complexity 2624 may be used as an estimate of stimulated reservoir volume 2628 by choosing a cutoff values of the complexity field that encompasses the portions of the reservoir that are well-connected (Action 2626). By creating an iso-surface defined by this complexity value, one can assess the volume of the reservoir is stimulated in that a fracture network is existing to drain the reservoir. The stimulated reservoir volume determined by using the fracture complexity (SRV:FC 2628) can be compared with the stimulates reservoir volume SRV: EFF 2630 determined from the Enhanced Fluid Flow method 2608 to determine an estimated SRV 2018.

Figure 27:
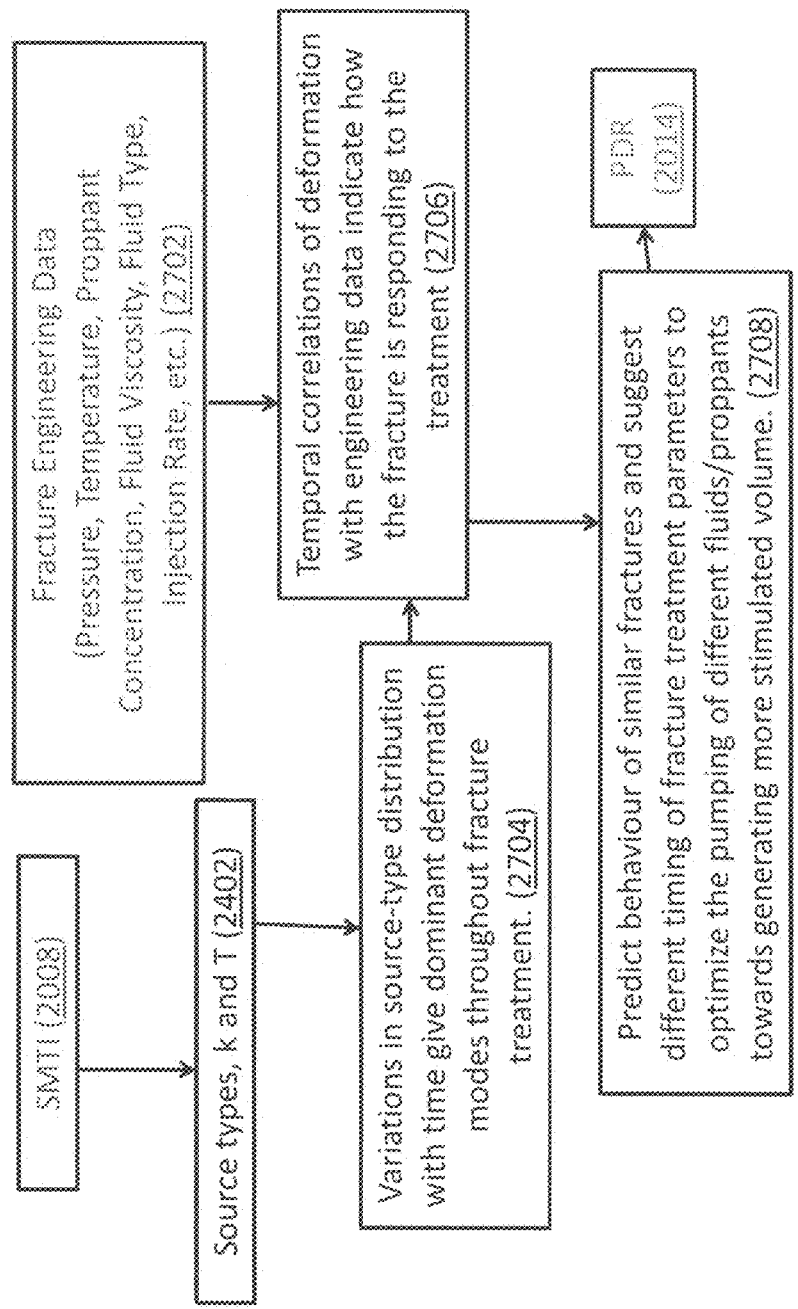
FIG. 27 is a block diagram illustrating an example of how to determine the point of diminishing returns (PDR) from the SMTI data and fracture engineering data.

Referring now to FIG. 27, the SMTI data 2008 can be correlated with engineering data 2702 used during the hydraulic fracturing process (ex. pressure, temperature, proppant concentration, fluid viscosity, fluid type, injection rate) to determine the point of diminishing returns (PDR) 2014 of the reservoir. Using the SMTI data 2008, a hydraulic fracturing engineer is able to determine the dominant deformation modes through the fractures over the time of the treatment (Action 2704), and when coupled with engineering data 2702 a hydraulic fracturing engineer can determine how the fracture is responding to the treatment (Action 2706). Using this information, the engineer can predict the behavior of similar geological structures, and can optimize the fracture treatment parameters for generating more stimulated volume for future fracture treatments of similar geological structures (Action 2708), and treatment can be carried out in accordance with the optimized fracture treatment parameters.

Figure 28:
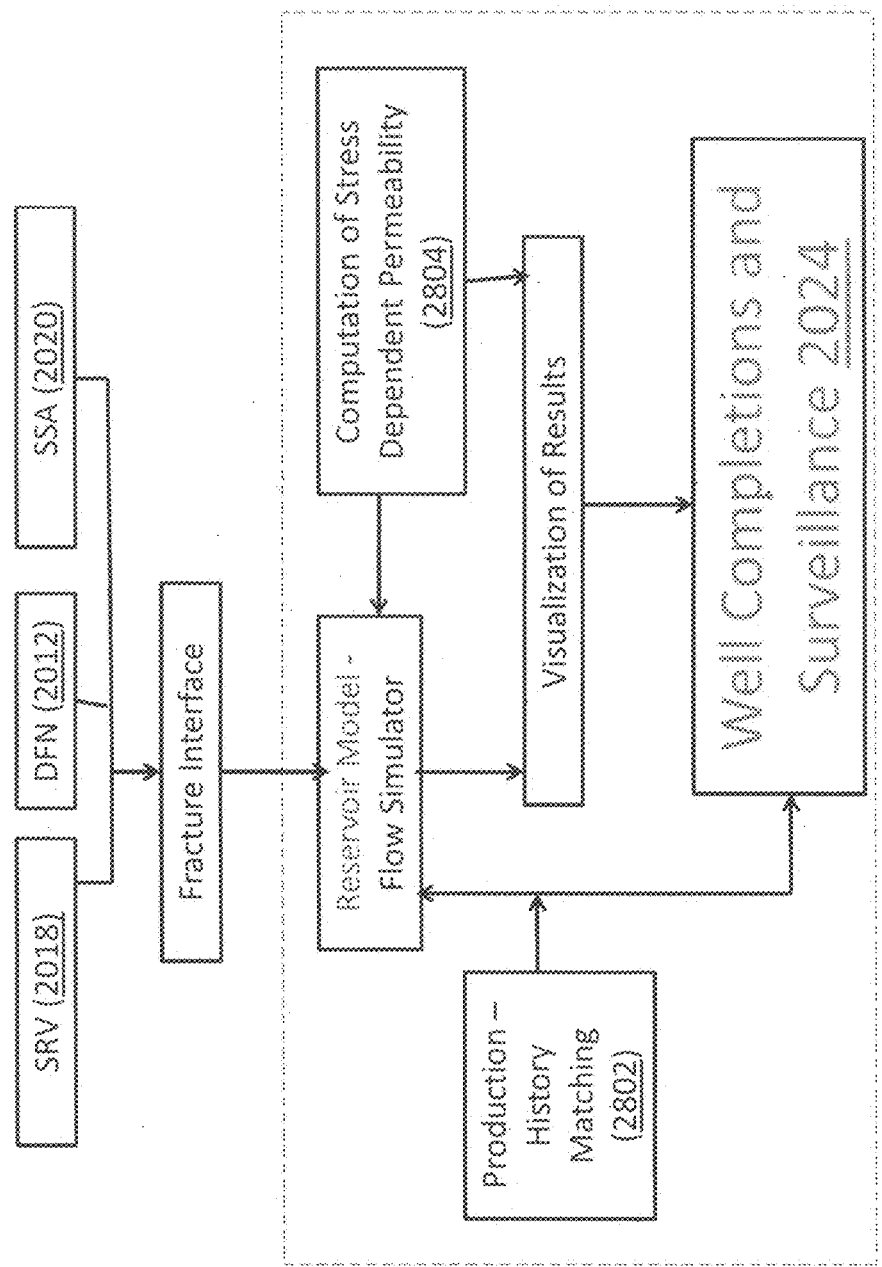
FIG. 28 is a block diagram illustrating the combination of structured reservoir volume model data, discrete fracture network model data, and stimulated surface area data, and an example algorithm for well surveillance and determining well completion.

Referring now to FIG. 28, the availability of the SRV, DFN, and SSA data provides a reservoir model that allows for a more complete understanding of the reservoir being treated. FIG. 28 is a block diagram illustrating the combination of structured reservoir volume model data 2018, discrete fracture network model data 2012, and stimulated surface area data 2020, and an example algorithm for well surveillance and determining well completion. Using the reservoir model derived from SRV 2018, DFN 2012 and SSA 2020 data, and combining it with production history matching data 2802 and stress dependent permeability data 2804, allows for well surveillance and monitoring for well completion 2024. Furthermore, these data yield observations that can be used to calibrate computational models of hydraulic fracturing. Varying the parameters of the reservoir, (i.e. the initial conditions of permeability, porosity, fluid saturation, pre-existing fracture network, etc.) to match the SMTI-derived data can assist in this understanding.

The process used for production history matching 2802 can be that similar to methods well-established in the oil industry as a way to verify predictions of stimulated reservoir volume. Predictions of SRV based on the moment tensor data and the DFN can be calibrated in a similar way: the data when coupled to a reservoir flow model can predict the amount of hydrocarbons produced over time. Any discrepancies between the predicted and observed flow rates can be related to an inadequacy of the assumptions in the modeling that led to the predictions. As such, these assumptions can be continuously adjusted to match the observed production rates leading to a better understanding of the reservoir dynamics and how the microseismic response leads to an estimate of SRV.

While the preferred embodiments of the present invention have been shown and described herein, it will be obvious that each such embodiment is provided by way of example only. Numerous variations, changes, and substitutions will occur to those skilled in the art without departing from the invention disclosed.

What is claimed is:

1. A method for determining results of hydraulic fracturing of a reservoir comprising:

collecting, from a plurality of seismic sensors located at the reservoir, microseismic data for microseismic events resulting from hydraulic fracturing of the reservoir;

modeling each of a plurality of the microseismic events as a set of fracture parameters for a fracture uniquely associated with the microseismic event, the fracture parameters being determined in dependence on the collected microseismic data, the fracture parameters for each microseismic event including a location of the uniquely associated fracture, a radius of the uniquely associated fracture, and a fracture plane orientation of the uniquely associated fracture;

determining a number of fracture plane intersections between nonparallel fractures in dependence on the locations, radiuses and fracture plane orientations of the fractures within a region of the reservoir;

determining fracture complexity of the region of the reservoir by tallying the number of fracture plane intersections of nearest neighbor events to a grid point;

determining a stimulated reservoir volume for the region of the reservoir as a representation of the effect of the hydraulic fracturing on the reservoir based on identification of sub-regions of the region for which the fracture complexity reaches a fracture complexity threshold; and optimizing fracture treatment parameters for future hydraulic fracturing of the reservoir by adjusting one or more of bottom hole pressure, proppant concentration, proppant composition, fluid density, fluid viscosity, fluid flow rate and fluid type in accordance with the determined stimulated reservoir volume for the region.

2. The method of claim 1 comprising:

generating source radius data for the plurality of microseismic events, wherein the source radius data comprises the location and the radius for each microseismic event;

determining a seismic moment tensor for at least some of the microseismic events, the seismic moment tensor comprising the fracture plane orientation and source mechanism type, wherein the fracture plane orientation is determined in dependence on whether the source mechanism type is determined to be one or a combination of an isotropic deformation, a double couple (DC) deformation or a compensated linear vector dipole (CLVD) deformation;

generating a discrete fracture network model of fractures which were activated during the hydraulic fracturing of the reservoir, wherein the discrete fracture network model is generated from the seismic moment tensor and source radius data of at least some of the plurality of microseismic events, wherein the discrete fracture network comprises the location, radius, fracture plane orientation, and source mechanism type of each of the at least some of the plurality of microseismic events.

3. The method of claim 2 comprising outputting a graphical representation of the discrete fracture network model, the graphical representation illustrating location, radius, orientation, and source mechanism type of each of the at least some of the plurality of microseismic events.

4. The method of claim 1 wherein at least some of the parameters are determined in dependence on a seismic velocity model and the collected microseismic data.

5. The method of claim 4, wherein the seismic velocity model is obtained from a well log, a vertical seismic profile, or by seismic profiling through reflection/refraction surveys.

6. The method of claim 1, further comprising:
outputting a graphical representation of the stimulated reservoir volume through an output device.

7. The method of claim 1, further comprising:
determining a point of diminishing returns using the parameters and fracture engineering data obtained from the hydraulic fracturing procedure by correlating the fracture engineering data with the data derived from the parameters in different time windows to determine when additional hydraulic fracturing treatment is not making effective changes as represented by an increasing number of microseismic events being opening seismic events.

8. A computer program product comprising:
a non-transitory computer usable medium, a computer readable program code stored on the medium, wherein such code when executed on a computer processor causes the processor to perform operations to implement the method of claim 1.

9. The method of claim 1 wherein calculating the number of fracture intersections includes premultiplying the radiuses of the fractures associated with the microseismic events within the region by a constant prior to determining the number of fracture intersections, determining an enhanced number of intersections in dependence on the multiplied radiuses, and dividing the enhanced number of intersections by the constant to calculate the number of fracture intersections.

10. The method of claim 9 comprising determining an iso-surface that encompasses the sub-region of the reservoir in which the fracture complexity threshold is reached, wherein the stimulated reservoir volume corresponds to the sub-region encompassed by the iso-surface.

11. The method of claim 1 comprising
determining, in dependence on the fracture parameters for at least some of the plurality of the microseismic events, spacing information between the fractures uniquely associated with the microseismic events,
determining opening apertures for a plurality of the fractures in dependence on the fracture parameters, and
determining a permeability enhancement of the plurality of fractures in dependence on the determined opening apertures and the fracture plane orientation and spacing information, and
determining a further stimulated reservoir volume in dependence on the permeability enhancement of the plurality of fractures.

12. The method of claim 11 wherein determining a permeability enhancement comprises determining within the region a plurality of fracture sets, each fracture set comprising similarly oriented fractures, summing the fracture sets, and determining a sub-region in which the summed fracture sets indicate a positive permeability enhancement in response to the hydraulic fracturing.

13. The method of claim 12 comprising:
comparing the stimulated reservoir volume and the further stimulated reservoir volume to derive a model stimulated reservoir volume.

14. The method of claim 13 wherein geophysical assumptions about the reservoir are used in calculating the fracture parameters, the method comprising comparing the model stimulated reservoir volume to a measured production from the reservoir and adjusting in dependence thereon the geophysical assumptions used to determine the fracture parameters.

15. The method of claim 1 further comprising determining a stimulated surface area caused by the hydraulic fracturing for a region of the reservoir, including:
determining, for a plurality of microseismic events located within the region, fracture surface areas of the fractures associated with the microseismic events in dependence on the radiuses of the microseismic events;
determining a weighted fracture surface area for each of the fractures by applying to the fracture surface areas a weighting factor that corresponds to a source mechanism type of the microseismic event associated with the fracture; and
summing the weighted fracture surface areas.

16. A system for determining the effect of hydraulic fracturing on a reservoir, the system comprising:
a plurality of seismic sensors for collecting microseismic data for plurality of microseismic events occurring at the reservoir in response to hydraulic fracturing;
a processing system receiving the microseismic data and configured to:
model each of a plurality of the microseismic events as a set of fracture parameters for a fracture uniquely associated with the microseismic event, the fracture parameters being determined in dependence on the collected microseismic data, the fracture parameters for each microseismic event including a location of the uniquely associated fracture, a radius of the uniquely associated fracture, and a fracture plane orientation of the uniquely associated fracture;
determine a number of fracture plane intersections between nonparallel fractures in dependence on the locations, radiuses and fracture plane orientations of the fractures within a region of the reservoir;
determine fracture complexity of the region of the reservoir by tallying the number of fracture plane intersections of nearest neighbor events to a grid point;
determine a stimulated reservoir volume for the region of the reservoir as a representation of the effect of the hydraulic fracturing on the reservoir based on identification of sub-regions of the region for which the fracture complexity reaches a fracture complexity thresholds; and optimizing fracture treatment parameters for future hydraulic fracturing of the reservoir by adjusting one or more of bottom hole pressure, proppant concentration, proppant composition, fluid density, fluid viscosity, fluid flow rate and fluid type in accordance with the determined stimulated reservoir volume for the region.

17. The system of claim 16 wherein the processing system receiving the microseismic data is configured to:

generate source radius data for a plurality of microseismic events, wherein the source radius data comprises the location and the radius for each microseismic event;

determine a seismic moment tensor for at least some of the microseismic events, the seismic moment tensor comprising the fracture plane orientation and source mechanism type, wherein the fracture plane orientation is determined in dependence on whether the source mechanism type is determined to be one or a combination of an isotropic deformation, a double couple (DC) deformation or a compensated linear vector dipole (CLVD) deformation;

generate a discrete fracture network model of fractures which were activated during the hydraulic fracturing of the reservoir, wherein the discrete fracture network model is generated from the seismic moment tensor and source radius data of each of the plurality of microseismic events, wherein the discrete fracture network comprises the location, radius, fracture plane orientation, and source mechanism type of each of the plurality of microseismic events.

18. The system of claim 16 comprising determining an iso-surface that encompasses the sub-region of the reservoir in which the fracture complexity threshold is reached, wherein the stimulated reservoir volume corresponds to the sub-region encompassed by the iso-surface.

19. The system of claim 16 wherein the processing system is configured to determine spacing information and opening apertures for a plurality of the fractures in dependence on the parameters, and determine a permeability enhancement of the plurality of fractures in dependence on the determined opening apertures and the fracture plane orientation and the spacing information, the stimulated reservoir volume being determined in dependence on the permeability enhancement of the plurality of fractures.

* * * * *